US011650674B2

(12) United States Patent
Jung et al.

(10) Patent No.: US 11,650,674 B2
(45) Date of Patent: *May 16, 2023

(54) ELECTRONIC DEVICE AND METHOD FOR MAPPING FUNCTION TO BUTTON INPUT

(71) Applicant: Samsung Electronics Co., Ltd., Gyeonggi-do (KR)

(72) Inventors: Inhyung Jung, Gyeonggi-do (KR); Sangheon Kim, Gyeonggi-do (KR); Jongwu Baek, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 17/564,660

(22) Filed: Dec. 29, 2021

(65) Prior Publication Data
US 2022/0121296 A1    Apr. 21, 2022

Related U.S. Application Data

(63) Continuation of application No. 16/780,291, filed on Feb. 3, 2020, now Pat. No. 11,216,089.

(30) Foreign Application Priority Data

Feb. 1, 2019    (KR) .......................... 10-2019-0014015

(51) Int. Cl.
G06F 3/0354    (2013.01)
G06F 3/0484    (2022.01)
G06F 3/0481    (2022.01)

(52) U.S. Cl.
CPC ........ G06F 3/03545 (2013.01); G06F 3/0481 (2013.01); G06F 3/0484 (2013.01)

(58) Field of Classification Search
CPC .. G06F 3/03545; G06F 3/0481; G06F 3/0484; G06F 1/1607; G06F 1/1626; G06F 1/1643; G06F 2200/1632; G06F 2203/0384; G06F 2203/04101; G06F 2203/04804; G06F 3/0416; G06F 2203/04807; G06F 3/04162; G06F 3/0482; G06F 3/0488; G06F 3/0487; G06F 3/04845; G06F 3/0485; G06F 3/0383

See application file for complete search history.

(56) References Cited

U.S. PATENT DOCUMENTS 5,969,712 A * 10/1999 Morita ................ G06F 3/03545
                                                715/810
2013/0050141 A1    2/2013 Park et al.
(Continued)

FOREIGN PATENT DOCUMENTS

KR    1020150092995    8/2015

OTHER PUBLICATIONS

International Search Report dated May 21, 2020 issued in counterpart application No. PCT/KR2020/001524, 8 pages.

(Continued)

*Primary Examiner* — Md Saiful A Siddiqui
(74) *Attorney, Agent, or Firm* — The Farrell Law Firm, P.C.

(57) ABSTRACT

Disclosed is an electronic device capable of intuitively allocating a function to a button of a digital pen using different types of signals generated from an input tool, and that can more conveniently set a user environment by intuitively mapping a function to a button input of the digital pen.

20 Claims, 16 Drawing Sheets

(56) References Cited

U.S. PATENT DOCUMENTS

| | | |
|---|---|---|
| 2013/0335380 A1 | 12/2013 | Griffin et al. |
| 2014/0015776 A1 | 1/2014 | Kim et al. |
| 2014/0055398 A1 | 2/2014 | Myung |
| 2014/0055426 A1 | 2/2014 | Park et al. |
| 2014/0146021 A1* | 5/2014 | Trethewey ............ G06F 3/0488 345/179 |
| 2014/0253465 A1 | 9/2014 | Hicks et al. |
| 2014/0253467 A1 | 9/2014 | Hicks et al. |
| 2014/0253520 A1 | 9/2014 | Cueto |
| 2014/0253521 A1* | 9/2014 | Hicks ................. G06F 3/03545 345/179 |
| 2016/0124528 A1* | 5/2016 | Feng ................. G06F 3/03545 345/179 |
| 2017/0322642 A1* | 11/2017 | Zhang ................. G06F 3/0484 |
| 2018/0081456 A1 | 3/2018 | Li et al. |
| 2018/0239511 A1 | 8/2018 | No et al. |
| 2018/0260044 A1* | 9/2018 | Touyama ............ G06F 3/03545 |
| 2018/0348893 A1 | 12/2018 | Kim et al. |
| 2020/0033962 A1 | 1/2020 | Moon et al. |

OTHER PUBLICATIONS

European Search Report dated Jan. 27, 2022 issued in counterpart application No. 20748732.3-1203, 11 pages.
European Search Report dated Jan. 31, 2023 issued in counterpart application No. 20748732.3-1224, 8 pages.

* cited by examiner

ELECTRONIC DEVICE AND METHOD FOR MAPPING FUNCTION TO BUTTON INPUT

CROSS-REFERENCE TO RELATED APPLICATION(S)

This application is a Continuation Application of U.S. patent application Ser. No. 16/780,291, filed on Feb. 3, 2020, in the United States Patent and Trademark Office, which is based on and claims priority under 35 U.S.C. § 119 to Korean Patent Application No. 10-2019-0014015, filed on Feb. 1, 2019, in the Korean Intellectual Property Office, the disclosures of which are incorporated herein by reference in their entireties.

BACKGROUND

1. Field

The disclosure relates generally to an electronic device, and more particularly, to a method for mapping a function to a button input of a digital pen of an electronic device.

2. Description of Related Art

Many electronic devices include a touch screen designed to provide an intuitive interaction to users. The electronic devices can be interlocked with input tools, such as a digital pen and a stylus. These input tools can provide input in separate manners; however, the conventional art lacks a link of these inputs to functions, which is an inconvenience to users.

Accordingly, there is a need in the art for a method and apparatus for mapping a function of the electronic device to an input of the button.

SUMMARY

Aspects of the disclosure are to address at least the above mentioned problems and/or disadvantages and to provide at least the advantages described below. Accordingly, an aspect of the disclosure is to provide an electronic device capable of intuitively allocating a function to a button of a digital pen using different types of signals generated from an input tool.

Another aspect of the disclosure is to provide an electronic device and a method that can more conveniently set a user environment by intuitively mapping a function to a button input of a digital pen.

In accordance with an aspect of the disclosure, an electronic device includes a housing, a touchscreen visible through a part of the housing, at least one wireless communication circuit disposed inside the housing and configured to be wirelessly connected to a pen that provides a button event, a processor disposed inside the housing and operatively connected to the display and the at least one wireless communication circuit, and a memory disposed inside the housing and operatively connected to the processor, the memory being configured to store an application program including a user interface for selecting at least one function, and to store instructions that, when executed, cause the processor to display the user interface on the display, at least partially receive, through the at least one wireless communication circuit, a first user input for selecting one function among the at least one function by using a button event of the pen while the user interface is displayed on the display, and map the selected function to an input made through the button and store the selected function in the memory, in response to the first user input.

In accordance with another aspect of the disclosure, a method for an electronic device wirelessly connected to a pen that provides a button event includes displaying a user interface for selecting at least one function, receiving a first user input for selecting one function among the at least one function by using the button event of the pen while the user interface is displayed, and mapping the selected function to an input made through the button, in response to the first user input.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
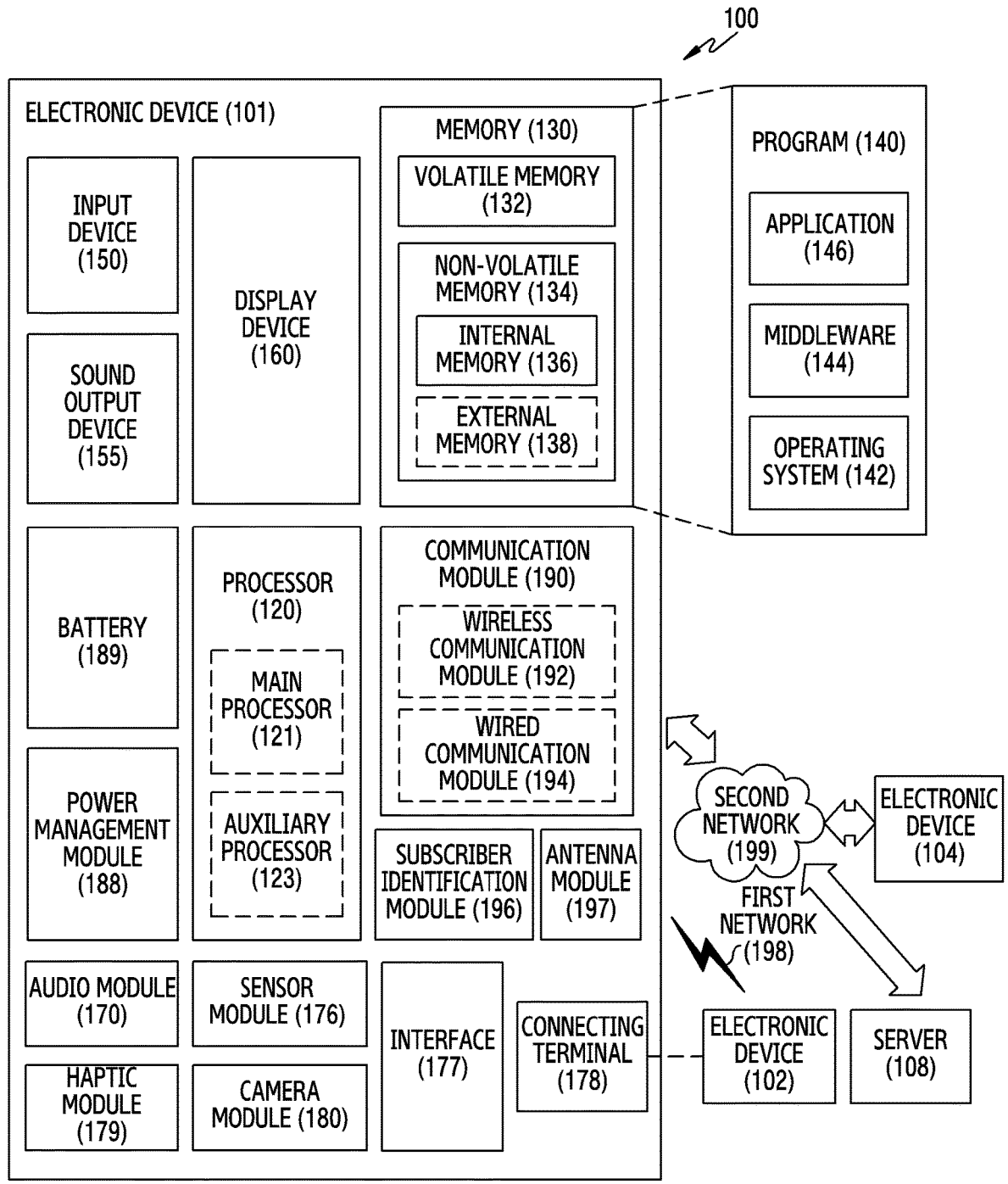
FIG. 1 illustrates an electronic device in a network environment according to an embodiment.

Embodiments of the present disclosure are described below with reference the accompanying drawings. In the disclosure, embodiments are described in the drawings and a related detailed description is set forth, but this is not intended to limit the embodiments of the present disclosure.

Descriptions of well-known functions and constructions are omitted for the sake of clarity and conciseness.

In the embodiments of the disclosure, a component included in the disclosure is expressed in the singular or the plural form. However, the singular or plural form is selected for convenience of description suitable for the presented situation, and embodiments of the disclosure are not limited to a single element or multiple elements. Either multiple elements expressed in the description may be configured into a single element or a single element in the description may be configured into multiple elements.

The terms used in the disclosure are only used to describe specific embodiments, and are not intended to limit the disclosure. A singular expression may include a plural expression unless these expressions differ in context. Unless defined otherwise, all terms used herein, including technical and scientific terms, have the same meaning as those commonly understood by a person skilled in the art to which the disclosure pertains. Such terms as those defined in a generally used dictionary may be interpreted to have the same meanings as the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

The electronic device according to embodiments may be one of various types of electronic devices, such as a portable communication device (e.g., a smartphone), a computer device, a portable multimedia device, a portable medical device, a camera, a wearable device, or a home appliance. However, the electronic devices are not limited to those described above.

It should be appreciated that embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in importance or order. It is to be understood that if an element, such as a first element, is referred to, with or without the term "operatively" or "communicatively", as "coupled with," "coupled to," "connected with," or "connected to" another element, such as a second element, it is indicated that the first element may be coupled with the second element directly (e.g., wiredly), wirelessly, or via a third element.

Embodiments of the disclosure will be described based on hardware. However, the embodiments of the disclosure include a technology that uses both hardware and software.

FIG. 1 illustrates an electronic device in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) card 196, and an antenna module 197. At least one of the components may be omitted from the electronic device 101, or one or more other components may be added in the electronic device 101. Some of the components may be implemented as single integrated circuitry. For example, the sensor module 176 may be implemented as embedded in the display device 160.

The processor 120 may execute a program 140 to control at least one other hardware or software component of the electronic device 101 coupled with the processor 120, and may perform various data processing or computation. As at least part of the data processing or computation, the processor 120 may load a command or data received from another component in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. The auxiliary processor 123 may be adapted to consume less power than the main processor 121, or to be for a specified function. The auxiliary processor 123 may be implemented as separate from, or as part of the main processor 121.

The auxiliary processor 123 may control at least some of functions or states related to at least one component among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component functionally related to the auxiliary processor 123.

The memory 130 may store various data used by at least one component of the electronic device 101. The various data may include the program 140 and input data or output data for a command related thereto. The memory 130 may include the volatile memory 132 and the non-volatile memory 134.

The program 140 may be stored in the memory 130 as software, and may include an operating system (OS) 142, middleware 144, and an application 146.

The input device 150 may receive a command or data to be used by other component of the electronic device 101, from outside (e.g., a user) of the electronic device 101. The input device 150 may include a microphone, a mouse, a keyboard, or a digital pen (e.g., a stylus pen).

The sound output device 155 may output sound signals to the outside of the electronic device 101, and may include a speaker or a receiver. The speaker may be used for general purposes, such as playing multimedia or music, and the receiver may be used for an incoming calls. The receiver may be implemented as separate from, or as part of the speaker.

The display device 160 may visually provide information to the user of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device 102 directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device 102 directly or wirelessly. The interface 177 may include a high definition multimedia interface (HDMI), a universal serial bus (USB) interface, a secure digital (SD) card interface, or an audio interface.

A connecting terminal 178 may include a connector to which the electronic device 101 may be physically connected with the external electronic device 102. The connecting terminal 178 may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via tactile or kinesthetic sensation. The haptic module 179 may include a motor, a piezoelectric element, or an electric stimulator.

The camera module 180 may capture a still image or moving images. The camera module 180 may include one or more lenses, image sensors, ISPs, or flashes.

The power management module 188 may manage power supplied to the electronic device 101 and may be implemented as at least part of a power management integrated circuit (PMIC).

The battery 189 may supply power to at least one component of the electronic device 101. The battery 189 may include a primary cell which is not rechargeable, a secondary cell which is rechargeable, or a fuel cell.

The communication module 190 may support establishing a wired communication channel or a wireless communication channel between the electronic device 101 and the external electronic device and performing communication via the established communication channel. The communication module 190 may include one or more CPs that are operable independently from the processor 120 (e.g., the AP) and supports a wired communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module).

A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM card 196.

The antenna module 197 may transmit or receive a signal or power to or from the external electronic device of the electronic device 101. The antenna module 197 may include an antenna including a radiating element composed of a conductive material or a conductive pattern formed in or on a substrate, such as a printed circuit board (PCB). The antenna module 197 may include a plurality of antennas. In such a case, at least one antenna appropriate for a communication scheme used in the communication network, such as the first network 198 or the second network 199, may be selected by the communication module 190 from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a same type as, or a different type from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud, distributed, or client-server computing technology may be used, for example.

Figure 2:
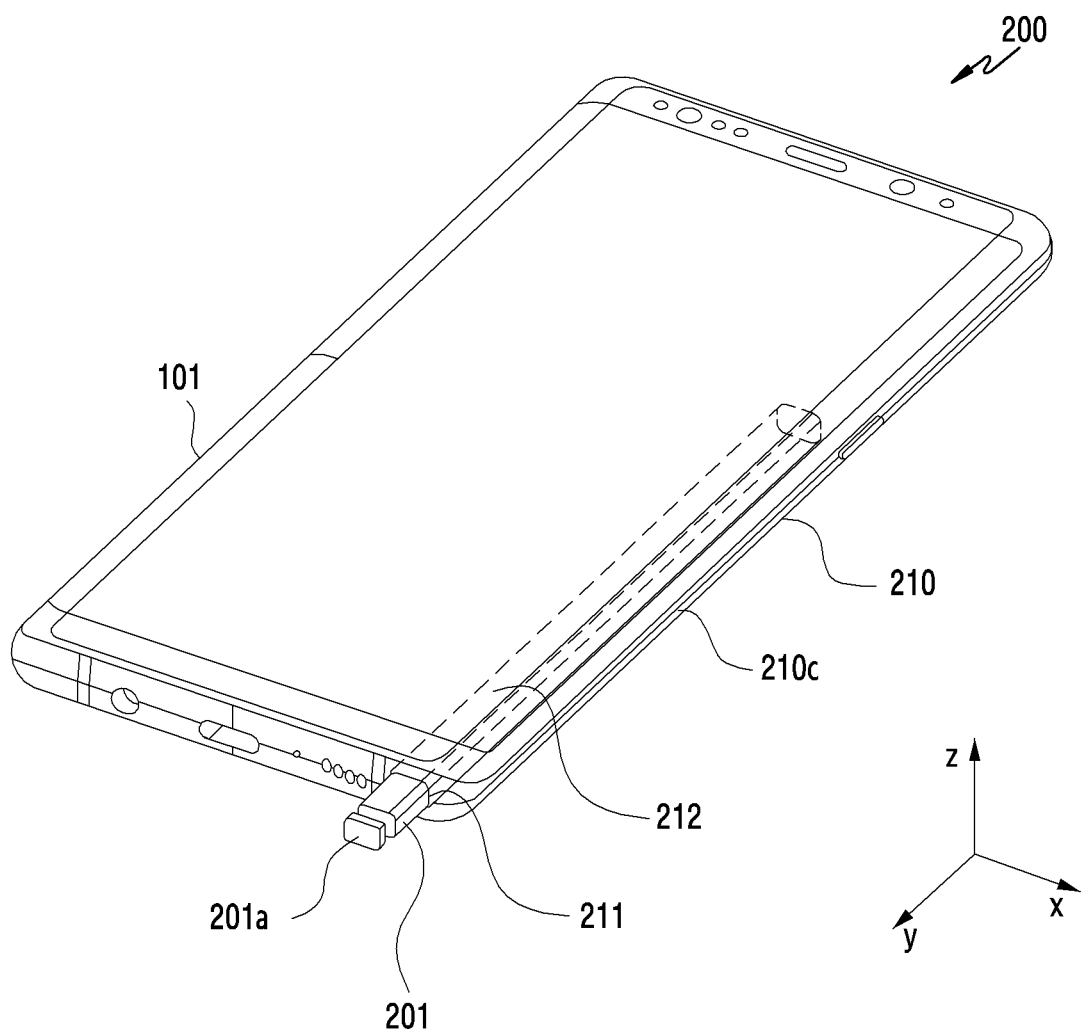
FIG. 2 is a perspective view of an electronic device including a digital pen according to an embodiment.

FIG. 2 is a perspective view 200 of an electronic device which includes a digital pen according to an embodiment.

Referring to FIG. 2, the electronic device 101 may include the configuration illustrated in FIG. 1, and may include a structure into which a digital pen 201 (e.g., a stylus pen) can be inserted. The digital pen 201 may be referred to as an input tool or an input means causing an input in the electronic device 101. The digital pen 201 may be referred to as a stylus in the aspect of having a pen shape. The electronic device 101 includes a housing 210, and may include a hole 211 in a part of the housing, such as part of a lateral face 210c. The electronic device 101 may include a storage space 212 connected to the hole 211, and the digital pen 201 may be inserted into the storage space 212. The digital pen 201 may include a push button 201a at one end thereof to facilitate pulling the digital pen 201 out of the storage space 212 of the electronic device 101. If the button 201a is pushed, repulsion mechanisms (e.g., at least one spring) configured to link with the button 201a may be operated, and the digital pen 201 may be separated from the storage space 212.

Figure 3:
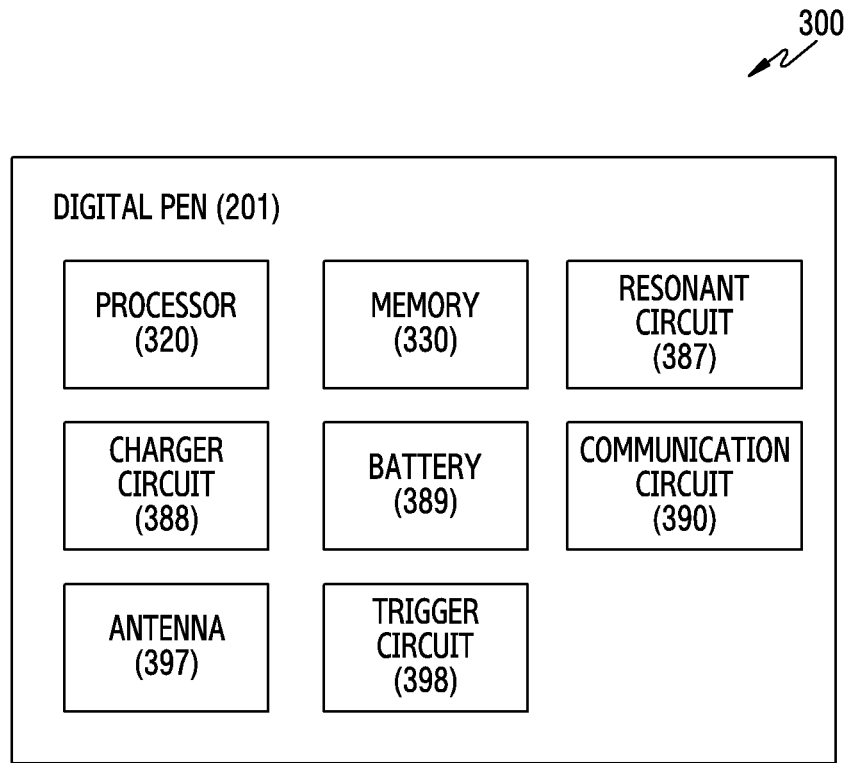
FIG. 3 illustrates a digital pen according to an embodiment.

FIG. 3 is a block diagram 300 illustrating a digital pen according to an embodiment.

Referring to FIG. 3, the digital pen 201 may include a processor 320, a memory 330, a resonant circuit 387, a charger circuit 388, a battery 389, a communication circuit 390, an antenna 397 and/or a trigger circuit 398. The processor 320, at least a part of the resonant circuit 387, and/or at least a part of the communication circuit 390 of the digital pen 201 may be configured on a PCB or in a chip form. The processor 320, the resonant circuit 387, and/or the communication circuit 390 may be electrically connected to the memory 330, the charger circuit 388, the battery 389, the antenna 397, or the trigger circuit 398. The digital pen 201 may solely comprise a resonant circuit and a button.

The processor 320 may include a generic processor configured to execute a customized hardware module or software and may include a hardware component (a function) or a software element (a program) that includes at least one of various sensors, a data measurement module, and an input/output interface, which are provided on the digital pen 201, and a module or a communication module that manages a state or an environment of the digital pen 201. The processor 320 may include one of or at least two of hardware, software, and firmware. The processor 320 may receive a proximity signal that corresponds to an electromagnetic signal generated from a digitizer of the electronic device 101 through the resonant circuit 387. If the proximity signal is received, the processor 320 may control the resonant circuit 387 to transmit an electromagnetic resonance (EMR) input signal to the electronic device 101.

The memory 330 may store information relevant to operations of the digital pen 201. For example, the information may include information for communication with the electronic device 101, and frequency information relevant to an input operation of the digital pen 201.

The resonant circuit 387 may include at least one of a coil, an inductor, or a capacitor. The resonant circuit 387 may be used for the digital pen 201 to generate a signal including a resonance frequency. For example, to generate the signal, the digital pen 201 may use at least one of an EMR mode, an active electrostatic (AES) mode, or an electrically coupled resonance (ECR) mode. When the digital pen 201 transmits a signal in the EMR mode, the digital pen 201 may generate the signal including the resonance frequency based on an electromagnetic field generated from an inductive panel of the electronic device 101. When the digital pen 201 transmits a signal in the AES mode, the digital pen 201 may generate the signal using capacity coupling with the electronic device 101. When the digital pen 201 transmits a signal in the ECR mode, the digital pen 201 may generate the signal including the resonance frequency based on an electric field generated from a capacitive element of the electronic device. The resonant circuit 387 may be used to change an intensity or a frequency of an electromagnetic field according to a handling state of a user. For example, the resonant circuit 387 may provide a frequency for recognizing a hovering, drawing, button, or erasing input.

When the charger circuit 388 is connected to the resonant circuit 387 based on a switching circuit, the charger circuit 388 may rectify a resonant signal generated from the resonant circuit 387 into a direct current signal, and may provide the direct current signal to the battery 389. The digital pen 201 may check whether the digital pen 201 is inserted into the electronic device 101 using a voltage level of the direct current signal sensed by the charger circuit 388.

The battery 389 may be configured to store power required for an operation of the digital pen 201. The battery may include a lithium-ion battery or a capacitor, and may be a chargeable or exchangeable type. The battery 389 may be charged using power (e.g., a direct current signal (direct current power)) supplied from the charger circuit 388.

The communication circuit 390 may be configured to perform a wireless communication function between the digital pen 201 and the communication module 190 of the electronic device 101. The communication circuit 390 may transmit status information and input information of the digital pen 201 to the electronic device 101 using near-field communication mode. For example, the communication circuit 390 may transmit direction information (e.g., motion sensor data) of the digital pen 201 which is acquired through the trigger circuit 398, audio information input through a microphone, or available capacity information of the battery 389 to the electronic device 101. The near-field communication mode may include at least one of Bluetooth™, Bluetooth low energy (BLE), or a wireless LAN.

The antenna 397 may be used to transmit or receive signals or power to or from the electronic device 101. The digital pen 201 may include a plurality of antennas 397, among which the digital pen 201 may select at least one antenna 397 suitable for the communication mode. The communication circuit 390 may exchange signals or power with the external electronic device through the selected at least one antenna 397.

The trigger circuit 398 may include at least one button or sensor circuit. The processor 320 may check an input mode (e.g., touch or push) or a type (e.g., an EMR button or a BLE button) of the button of the digital pen 201. The sensor circuit may generate an electrical signal or a data value that corresponds to an internal operation state or an external environment state of the digital pen 201. For example, the sensor circuit may include at least one of a motion sensor, a battery available capacity sensor, a pressure sensor, a photosensor, a temperature sensor, a terrestrial magnetic sensor, and a biological sensor. The trigger circuit 398 may transmit a trigger signal to the electronic device 101 using an input signal of the button or a signal from the sensor.

Figure 4:
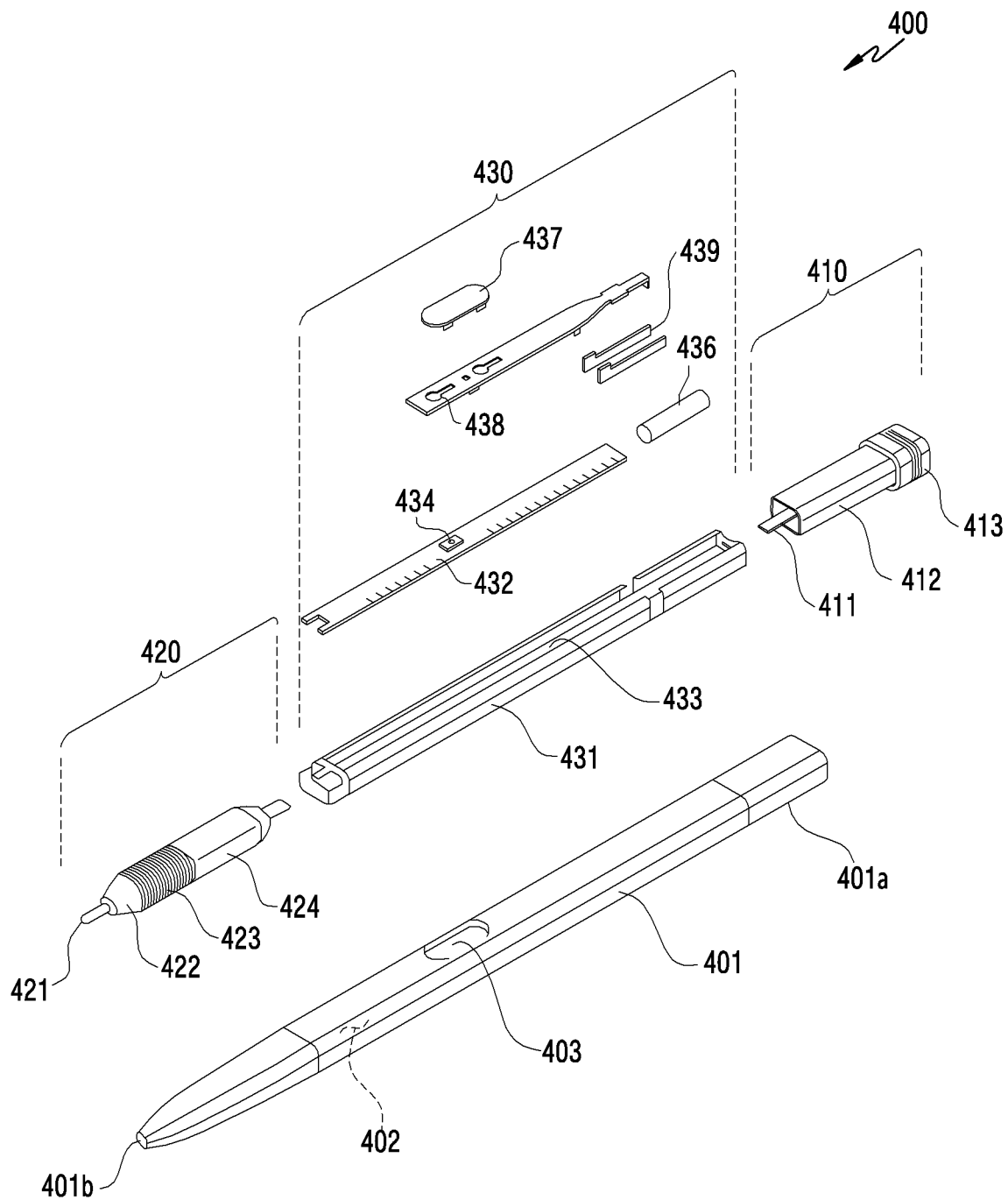
FIG. 4 is an exploded perspective view of a digital pen according to an embodiment.

FIG. 4 is an exploded perspective view 400 of a digital pen according to an embodiment.

Referring to FIG. 4, the digital pen 201 may include a pen housing 401 that forms a contour of the digital pen 201, and an inner assembly inside the pen housing 401. The inner assembly may be inserted into the pen housing 401 by one assembly operation along with various components mounted in the pen.

The pen housing 401 has an elongated shape that extends between a first end 401a and a second end 401b, and may include a storage space 402. The pen housing 401 may have an elliptical shape whose cross section is made up of a major axis and a minor axis, and may be formed in an oval columnar shape. The storage space 212 of the electronic device 101 may also be formed to have an elliptical cross section corresponding to the shape of the pen housing 401. The pen housing 401 may be formed of a synthetic resin (e.g., a plastic) and/or a metallic material (e.g., aluminum). The second end 401b of the pen housing 401 may be formed of a synthetic resin material.

The inner assembly may have a prolonged shape corresponding to the shape of the pen housing 401. The inner assembly may be roughly divided into three components in a lengthwise direction. For example, the inner assembly may include an ejection member 410 that is disposed at a position corresponding to the first end 401a of the pen housing 401, a coil part 420 that is disposed at a position corresponding to the second end 401b of the pen housing 401, and a circuit board part 430 that is disposed at a position corresponding to a body of the housing.

The ejection member 410 may include a configuration for pulling the digital pen 201 out of the storage space 212 of the electronic device 101. The ejection member 410 may include a shaft 411, and a ejection body 412 and a button part 413 that are disposed around the shaft 411 and form a contour of the ejection member 410. If the inner assembly is completely inserted into the pen housing 401, a portion including the shaft 411 and the ejection body 412 is surrounded by the first end 401a of the pen housing 401, and the button part 413 may be exposed to the outside of the first end 401a. A plurality of components, such as cam members or elastic members, may be disposed in the ejection body 412, and may form a push-pull structure. The button part 413 may be substantially coupled with the shaft 411, and may linearly reciprocate with respect to the ejection body 412. The button part 413 may include a button in which a nipping structure is formed to enable a user to pull out the digital pen 201 using his/her fingernails.

The coil part 420 may include a pen tip 421 that is exposed to the outside of the second end 401b if the inner assembly is completely inserted into the pen housing 401, a packing ring 422, a coil 423 wound with a plurality of turns, and/or a pen pressure sensing part 424 for acquiring a change in pressure according to pressurization of the pen tip 421. The packing ring 422 may include epoxy, rubber, urethane, or silicone. The packing ring 422 can be provided for waterproofing and dustproofing, and can protect the coil part 420 and the circuit board part 430 from water or dust. The coil 423 may generate a resonance frequency in a set frequency band (e.g., 500 kilohertz (kHz)), and may be combined with at least one element (e.g., a capacitor) such that the resonance frequency generated by the coil 423 can be adjusted in a prescribed range.

The circuit board part 430 may include a PCB 432, a base 431 that surrounds at least one surface of the PCB 432, and an antenna. A board seat 433 on which the PCB 432 is disposed may be formed on an upper surface of the base 431, and the PCB 432 may be fixed when it is seated on the board seat 433. The PCB 432 may include upper and lower surfaces, on the upper surface of which a variable capacitance capacitor or a switch 434 connected to the coil 423 may be disposed, and on the lower surface of which a charger circuit, a battery, or a communication circuit may be disposed. The battery may include an electric double layered capacitor (EDLC). The charger circuit may be located between the coil 423 and the battery, and may include a voltage detector circuitry and a rectifier.

The antenna may be embedded in an antenna structure 439 and/or the PCB 432 as in the example illustrated in FIG. 4. The switch 434 may be provided on the PCB 432. A side button 437 provided on the digital pen 201 may be used to push the switch 434, and be exposed outside through a side opening 403 of the pen housing 401. The side button 437 may be supported by a support member 438 which may provide an elastic restoring force if there is no external force acting on the side button 437, and may restore or maintain the side button 437 as disposed at a fixed position.

The circuit board part 430 may include another packing ring such as an O-ring. For example, O-rings made of an elastomer may be disposed at both ends of the base 431, and a sealing structure may be formed between the base 431 and the pen housing 401. The support member 438 may be partly in close contact with an inner wall of the pen housing 401 around the side opening 403, and may form a sealing structure. For example, the circuit board part 430 may form a waterproof and dustproof structure similar to the packing ring 422 of the coil part 420.

The digital pen 201 may include a battery seat 435 on which the battery 436 is disposed on an upper surface of the base 431. The battery 436 that can be mounted on the battery seat 435 may include a cylinder type battery.

The digital pen 201 may include a microphone directly connected to the PCB 432, or connected to a separate flexible PCB (FPCB) connected to the PCB 432. The microphone may be disposed at a position parallel to the side button 437 in a lengthwise direction of the digital pen 201.

It is illustrated in FIG. 4 that the digital pen 201 includes the button part 413 and the side button 437. However, this is merely an example, and the disclosure is not limited thereto. The digital pen 201 may provide button events other than through the physical buttons, such as through sensors. The digital pen 201 may provide a button event that senses an input of a user through a touch sensor and corresponds to the sensed input. The digital pen 201 may sense an input of a user (e.g., two taps) through a touch sensor.

Figure 5:
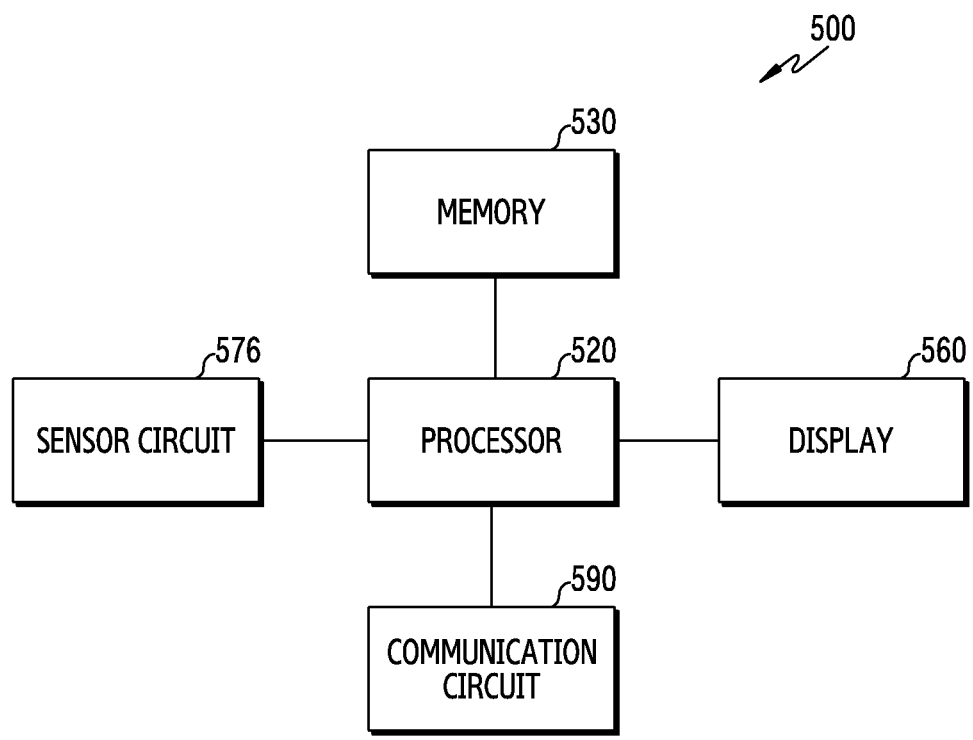
FIG. 5 illustrates an example of a functional configuration of an electronic device an embodiment.

FIG. 5 illustrates an example of a functional configuration 500 of the electronic device 101 according to an embodiment. Referring to FIG. 5, the electronic device 101 may include a processor 520, a memory 530, a display 560, a communication circuit 590, and/or a sensor circuit 576.

The processor 520 may receive a signal from the digital pen 201 located over the display 560 using the communication circuit 590. The signal may be a radio signal on a communication path established between the electronic device 101 and the digital pen 201 according to a wireless communication mode. As an example, the radio signal may be a signal according to the BLE standard. As another example, the processor 520 may receive an electromagnetic signal from the digital pen 201 spaced apart from the display 560 using the sensor circuit 576. The signal may be caused at the digital pen 201 by an electromagnetic signal transmitted from the electronic device 101 through the sensor circuit 576. As the electromagnetic signal is transmitted, the electromagnetic signal is induced in the coil of the digital pen 201. Thereby, the electronic device 101 may receive the electromagnetic signal induced from the digital pen 201.

The processor 520 may activate a mapping mode such that the functional configurations of the electronic device 101 operate to map specific functions to the button events of the digital pen 201. The processor 520 may determine functions to be mapped to the button events. The processor 520 may identify the button events to which the functions are to be mapped based on at least one of an application in execution, an input detected on the communication circuit 590, or an input detected on the sensor circuit 576. The processor 520 may map functions to be mapped to the button events. The functions mapped to the button events may be associated with each other. When a specific function is mapped to the button event, if the button event is detected, the processor 520 may perform the specific function. The processor 520 may perform the functions to be mapped to the button events with reference to the memory 530 as described below.

The memory 530 may store a mapping relationship between the button event of the digital pen 201 and the specific function of the digital pen 201. The functions may be mapped to the plurality of button events of the digital pen 201. The memory 530 may store a mapping table that defines a relationship between the button event and the function. An event for performing a specific function may be defined based on a combination of the button event of the digital pen 201 and an input of a user. The memory 530 may store information about the combination of the button event and the input of a user, and a mapping relationship between the defined events.

The display 560 may display a user interface (UI) for displaying the functions to be mapped to the button events of the digital pen 201, and for identifying the button events of the digital pen 201. The display 560 may display an input of a user who uses the digital pen 201 based on at least one of a slope, a pressure, and a locus of a tip of the digital pen 201 on the display 560.

The communication circuit 590 may receive a communication signal of the digital pen 201. The communication circuit 590 may perform functions for transmitting/receiving signals through a radio channel. The communication circuit 590 may include at least one communication module for supporting at least one radio access technology (RAT). The communication circuit 590 may perform a conversion function between a baseband signal and a bit stream according to the physical layer protocol. After the communication circuit 590 up-converts the baseband signal to an RF band signal, the communication circuit 590 may transmit the RF band signal through an antenna, and down-convert the RF band signal received through the antenna into a baseband sign. The communication circuit 590 may form a communication path with the digital pen 201 through the communication module 190. The communication circuit 590 may receive a radio signal, such as a BLE signal, transmitted from the digital pen 201.

The sensor circuit 576 may be configured to receive input from the digital pen 201 illustrated in FIG. 3 or 4 based on the control of the processor 520. The sensor circuit 576 may be referred to as an EMR circuit, an EMR panel, or a digitizer. The sensor circuit 576 may be disposed below the display 560. The sensor circuit 576 may receive an electromagnetic signal radiated from the coil as the digital pen 201 approaches the display 560 of the electronic device 101. The sensor circuit 576 radiates an electromagnetic field and receives an EMR signal, and thus may be called a communication circuit.

According to an embodiment, an electronic device according to embodiments includes a housing, a touchscreen display that is visible through a part of the housing; at least one wireless communication circuit that is located inside the housing and is connected to a stylus pen providing button events by radio, a processor that is located inside the housing and is operatively connected to the display and the at least one wireless communication circuit, and a memory that is located inside the housing and is operatively connected to the processor. The memory is configured to store an application program that includes a UI for selecting at least one function. When executed, the memory stores instructions to cause the processor to display the UI on the display, to at least partly receive a first user input that selects one of the at least one functions using the button event of the stylus pen through the at least one wireless communication circuit when the UI is displayed on the display, and to map the selected function to an input via the button event in response to the first user input to store the selected function in the memory.

The instructions may be configured such that the processor receives a second user input from the button event through the at least one wireless communication circuit when the UI is displayed on the display after the selected function is stored, and performs the selected function in response to the second user input.

The at least one wireless communication circuit may include a first wireless communication circuit and a second wireless communication circuit, and the instructions may be configured such that the processor receives the first user input by receiving a first signal indicating that the button of the pen is pushed using the first wireless communication circuit and by receiving a second signal indicating that the button is released using the second wireless communication circuit.

The instructions may be configured such that the processor receives the first signal when it is sensed that the pen is in contact with or close to the display, acquires at least one of input position information, locus information, movement speed information, or pressure information of the pen based on at least a part of the received first signal, and selects one of the at least one functions based on at least a part of the acquired information.

The instructions may be configured such that the processor maps the selected function to the input from the button by receiving the second signal in a state in which it is sensed that the pen is located beyond a distance selected from the display after the first signal is received.

The instructions may be configured such that the processor displays a graphic user interface (GUI), which indicates that the selected function is mapped to the input from the button in response to the reception of the first signal, on the display.

The first wireless communication circuit may be a circuit configured to support EMR communication, and the second wireless communication circuit may be a circuit configured to support BLE communication.

The electronic device may further include the pen configured to generate the first signal by pushing the button of the pen at least once.

The first user input received using the button of the pen may include an event for performing a specific function using the pen, and the selected function may be the specific function.

A section in which the pushing input of the pen occurs may be where the first user input is received.

Hereinafter, disclosed are a device and method for intuitively mapping functions of the electronic device 101 to button events relevant to a button located at the digital pen 201 through a communication signal (e.g., a BLE signal) and an EMR signal between the electronic device 101 and the digital pen 201. A region according to a positional relationship between the electronic device 101 and the digital pen 201 may be divided.

First and second regions may be defined according to the positional relationship between the electronic device 101 and the digital pen 201. The first region may be where an electromagnetic signal over a fixed value can be detected by the electronic device 101, and may be referred to as a hoverable region. The second region may indicate a region in which an electromagnetic signal over a fixed value cannot be detected by the electronic device 101, and may be referred to as a near field communication region. The electronic device 101 may detect a button input of the digital pen 201 by receiving an EMR signal from the digital pen 201 in the first region. The electronic device 101 may detect a button input of the digital pen 201 by receiving a BLE signal from the digital pen 201 in the second region.

Figure 6:
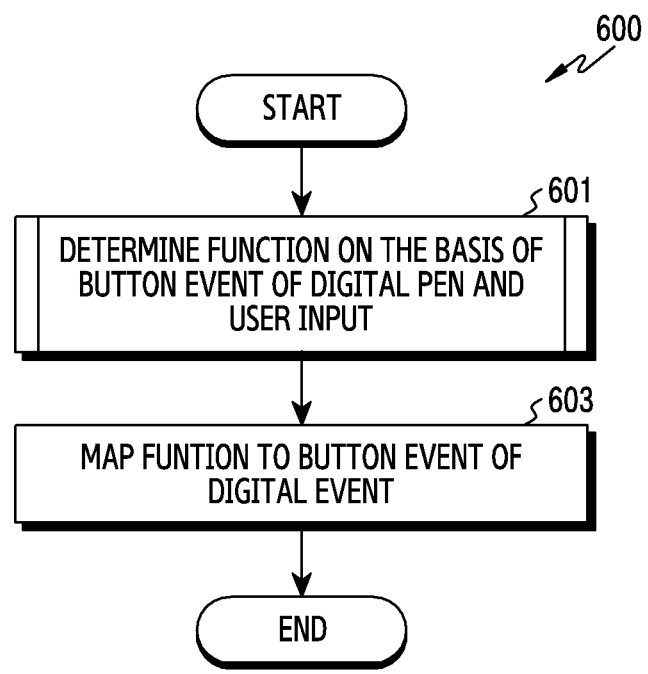
FIG. 6 illustrates a method of an electronic device for mapping a function according to an embodiment.

FIG. 6 illustrates a method 600 of the electronic device for mapping functions according to an embodiment. Referring to FIG. 6, in step 601, the electronic device 101 may determine functions based on the button events of the digital pen 201 and the user input.

The electronic device 101 may detect button events provided by the digital pen 201. The digital pen 201 may variously sense a user input to provide button events through a physical button. For example, the digital pen 201 may sense a user input corresponding to push, release, two pushes, or push holding of the physical button, and provide button events corresponding to the user input. Alternatively, the digital pen 201 may provide various button events through a sensor. For example, the digital pen 201 may sense user input corresponding to one tap, two taps, touch holding, or a specific pressure level through a touch sensor, and provide button events corresponding to the user input.

The electronic device 101 may activate a mapping mode based on the button event of the digital pen 201. The electronic device 101 may detect a button input of the digital pen 201 in various manners. The electronic device 101 may activate a mapping mode based on reception of an electromagnetic signal and/or a communication signal.

The electronic device 101 may determine button events. The electronic device 101 may determine a button event used in activating the mapping mode to be a button event to which a function will be mapped. Alternatively, the electronic device 101 may determine a button event to which a function will be mapped through separate user input.

The electronic device 101 may receive a user input for determining a function to be mapped to a button event. The user input may include a touch input acquired as the digital pen 201 comes into contact with the display, a hovering input, or an input received on a hovering region (e.g., a button input of the digital pen 201 in a hovered state). The electronic device 101 may identify a function based on the user input. This function may be called an action, an event, a command, a function, or an algorithm as an operation that is operated according to an instruction input to the electronic device 101.

The electronic device 101 may identify one of a plurality of functions through user input. For example, when a user input corresponds to a function of "play the next song" among "playback," "stop," "play the previous song," and "play the next song," the electronic device 101 may identify "play the next song." The electronic device 101 may determine the same function as the function which the user input provides. For example, in a swipe operation from the left side to the right side (or from the right side to the left side) in which the user input performs a function of "go to the next page" in an electronic book application, the electronic device 101 may determine the function of "go to the next page."

The electronic device 101 may receive a user input for determining a function until an extraction event is detected. If the extraction event is detected, even if the user input is received, the electronic device 101 may not use the received user input to determine the function. By defining the mapping mode and the extraction mode, a collision between the user input, such as a drawing input, for performing the function on the display of the electronic device 101 and the user input for determining the function of mapping the button events of the digital pen 201 can be prevented.

The electronic device 101 may determine an extraction event based on the button event. The electronic device 101 may determine that the extraction event is detected when, as a position of the digital pen 201 is located beyond a hoverable region, an electromagnetic signal is no longer detected, and the electromagnetic signal is received from the digital pen 201 within a critical time after the electromagnetic signal is no longer detected. Alternatively, the electronic device 101 may determine that the extraction event is detected when a push input of the button of the digital pen 201 beyond the hoverable region is not detected within a critical time.

The electronic device 101 may determine a function to be mapped based on the user input from a point in time when a mapping mode is activated to a point in time when an extraction event is detected. When the extraction event is detected, the electronic device 101 may determine a function identified or determined through the user input to be mapped to a button event. The electronic device 101 may extract a function of a user input to be mapped to a button event based on at least one of a section in which a communication signal is detected depending on use of the digital pen 201, a section in which an electromagnetic signal is detected, a temporal relationship between the sections, a difference in temporal region between the two sections, or a detection combination of the sections.

In step 603, the electronic device 101 may map functions to the button events of the digital pen 201. The electronic device 101 may store a mapping relationship between the button events of the digital pen 201 and specific functions. For example, the electronic device 101 may store an identifier (ID) of the button event of the digital pen 201 and an ID indicating a specific function. The electronic device 101 may store an ID of an application on which the specific function is performed. A mapping table that defines a relationship between functions corresponding to a plurality of button events may be stored. When an event occurs for performing a specific function based on a combination between the button event of the digital pen 201 and the user input, a mapping relationship between combination information of the button event and the user input and the defined event may be stored.

If the electronic device 101 detects a button event to which a function is mapped, the electronic device 101 may perform the mapped function. The electronic device 101 may perform a function associated with the button event in response to detection of the button event. The electronic device 101 may receive an ID of a function corresponding to the ID of the button event from the memory. The electronic device 101 may perform the function according to the ID of the function. The electronic device 101 may search for the detected button event in the mapping table of the memory. The mapping table may include functions corresponding to the plurality of button events. The electronic device 101 may perform an associated function based on the discovered result of the mapping table.

Figure 7:
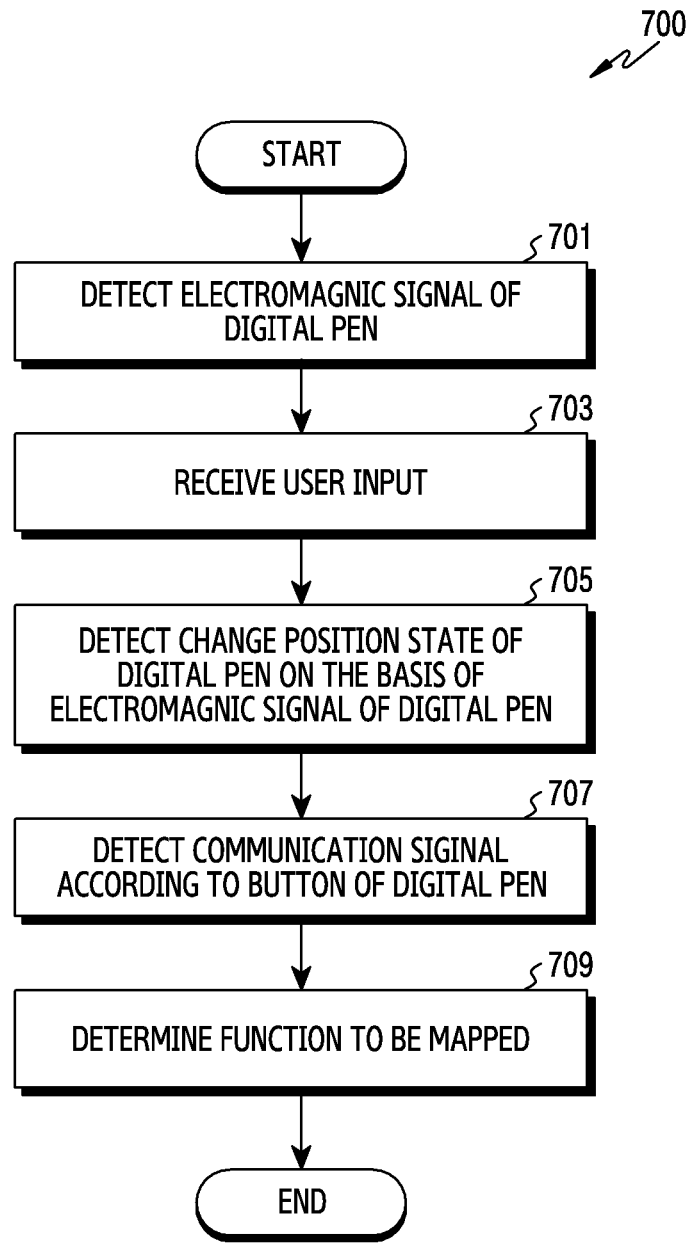
FIG. 7 illustrates a method of an electronic device for determining a function to be mapped according to an embodiment.

FIG. 7 illustrates a method 700 of the electronic device for determining functions to be mapped in accordance with an embodiment. FIG. 7 is a part of step 601 of FIG. 6.

Referring to FIG. 7, in step 701, the electronic device 101 may detect the electromagnetic signal of the digital pen 201. As the digital pen 201 approaches the electronic device 101, the electronic device 101 may detect the electromagnetic signal. The display of the electronic device 101 may include a digitizer. The digitizer of the electronic device 101 may generate an electromagnetic field signal as the digital pen 201 approaches the electronic device 101. The digital pen 201 may control the resonant circuit to transmit the electromagnetic signal, in response to the electromagnetic field signal being received. The electronic device 101 may receive the electromagnetic signal from the digital pen 201. The electronic device 101 may determine that the positional state of the digital pen 201 is a first region by detecting the electromagnetic signal from the digital pen 201. The electronic device 101 may detect a change in the distance between the digital pen 201 and the electronic device 101 and the button events of the digital pen 201 through a change in electromagnetic signal in the first region.

The electronic device 101 may detect not only the electromagnetic signal but also the communication signal in the first region. The electronic device 101 may detect a region in which the digital pen 201 is located and the button events of the digital pen 201 using the electromagnetic signal and/or communication signal in the first region. The electronic device 101 may detect that the push input of the button of the digital pen 201 is continued on the first region, i.e. a hoverable region. The electronic device 101 may detect that the push input of the button of the digital pen 201 is continued by repeatedly detecting the electromagnetic signal.

In step 703, the electronic device 101 may receive the user input in which a function to be mapped in the button events of the digital pen 201 is selected. The function to be mapped may be identified from among a plurality of functions by the user input, may be set based on application information, or may be a function performed by the user input. The user input may indicate that a preset function is allowed. The section in which the push input of the button of the digital pen 201 is continued may include the section in which the user input is received. The electronic device 101 may receive the user input during the section in which the push input of the button of the digital pen 201 is continued. The electronic device 101 may receive the user input during the section in which the push input of the button of the digital pen 201 is continued based on the electromagnetic signal induced by the digitizer.

In step 705, the electronic device 101 may detect a change in the positional state of the digital pen 201 based on the electromagnetic signal of the digital pen 201. The electronic device 101 may radiate the electromagnetic field signal, based on which the electromagnetic signal is induced to the coil of the digital pen 201. If the distance between the digital pen 201 and the electronic device 101 exceeds a critical range, the electromagnetic signal may not be induced to the digital pen 201. Accordingly, the electronic device 101 may not further detect the electromagnetic signal transmitted by the digital pen 201. That is, the electronic device 101 may detect that the EMR has been terminated. As the electromagnetic signal is not detected, the electronic device 101 may detect that the positional state of the digital pen 201 has moved from the first region to a second region. The electronic device 101 may not detect the electromagnetic signal in the second region. The electronic device 101 may detect the button events of the digital pen 201 by the BLE signal in the second region.

In step 707, the electronic device 101 may detect the communication signal of the button of the digital pen 201. The digital pen 201 may transmit the communication signal through a communication path between the digital pen 201 and the electronic device 101. The communication path may be a near field communication path a BLE communication path. Since the digital pen 201 is located out of the hoverable region, the electronic device 101 may receive the communication signal from the digital pen 201 by the communication module. The electronic device 101 may detect the input of the button of the digital pen 201 by receiving the communication signal.

The electronic device 101 may extract the function to be mapped to the button events of the digital pen 201 by receiving the communication signal, until the input of the button of the digital pen 201 is detected based on the communication signal by receiving the user input. When the communication signal is detected within the critical time after the positional state of the digital pen 201 is detected to be out of the hoverable region, the electronic device 101 may determine the function to be mapped to the button events. The critical time may be determined based on at least one of a characteristic of at least one of an application providing the function to be mapped, an execution time of the function, and the type of the electronic device 101. As in steps 705 to 707, an event in which end points of inputs for determining functions are generated on a detection section of the electromagnetic signal or the communication signal may be referred to as an extraction event. When the extraction event occurs, the electronic device 101 may deactivate the mapping mode. The electronic device 101 may determine the completion of the extraction process.

When the push input of the button of the digital pen 201 is performed, the communication signal may be transmitted. The electronic device 101 may detect the push input of the button of the digital pen 201 by a near field communication module of the communication circuit. The electronic device 101 may receive the push input of the button of the digital pen 201 by receiving the communication signal from the digital pen 201 located in the second region. In addition, in a releasing operation after the push input of the button of the digital pen 201, the communication signal may be transmitted. For example, the electronic device 101 may detect the push input of the button of the digital pen 201 by an electromagnetic module of the sensor circuit, and may detect the releasing after the push input of the button of the digital pen 201 by the near field communication module of the communication circuit.

In step 709, the electronic device 101 may determine the function to be mapped based on the user input by detecting the extraction event. The electronic device 101 may deactivate the mapping mode by detecting the extraction event. The electronic device 101 may generate indication information indicative of a function. The indication information may include at least one of information regarding an application by which the function is executed and identification information indicating the function.

Figure 8:
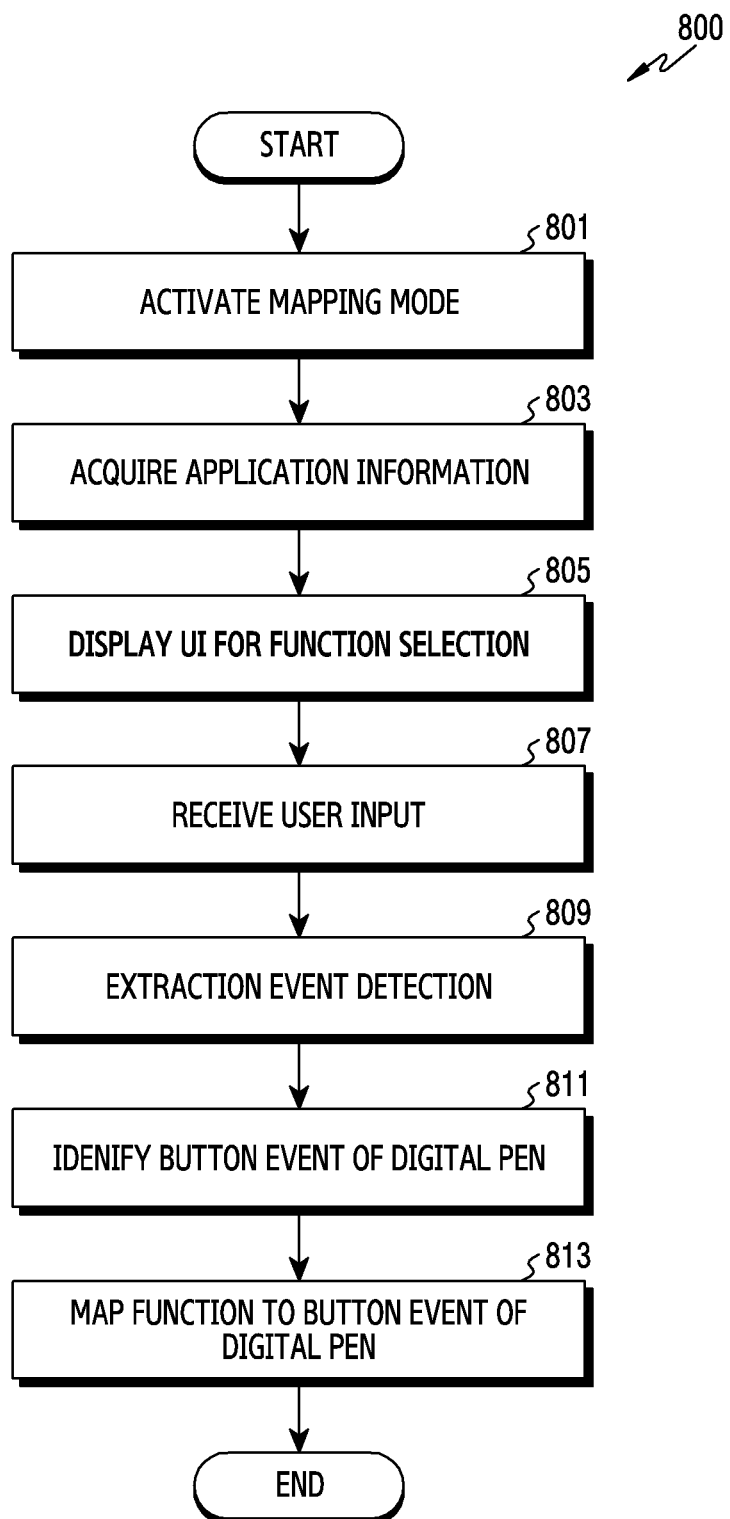
FIG. 8 illustrates a method of an electronic device for mapping a function for each object according to an embodiment.
Figure 9A:
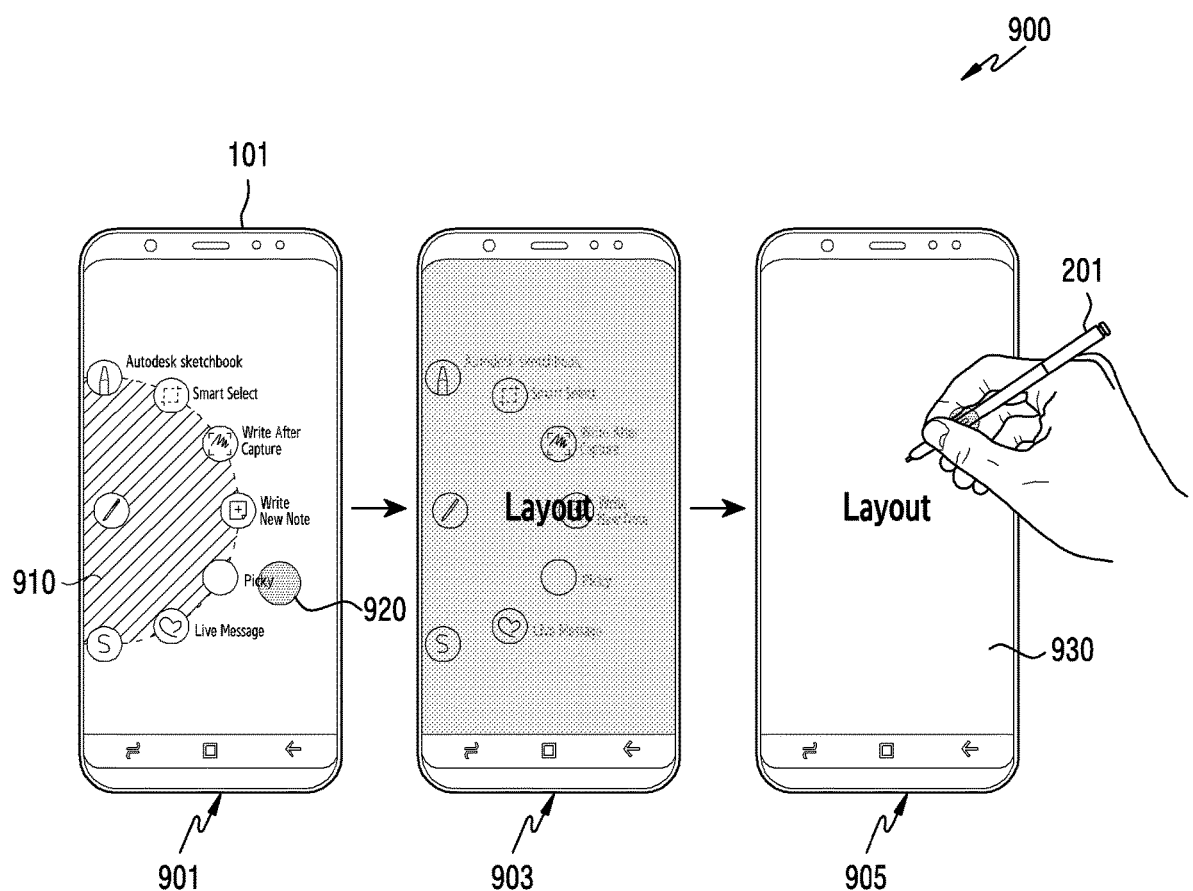
FIG. 9A illustrates an example of mapping a function for each object by an electronic device according to an embodiment.
Figure 9B:
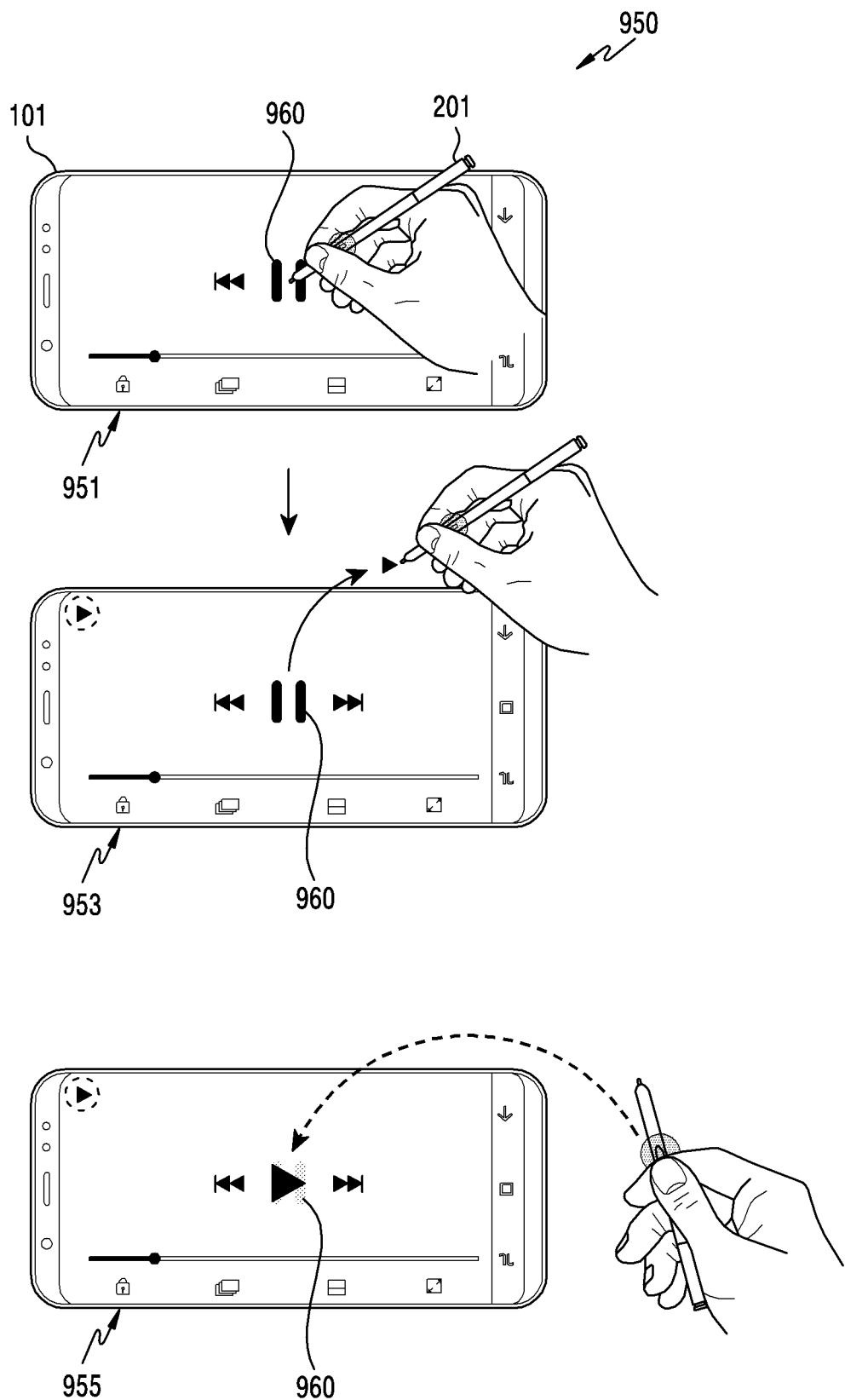
FIG. 9B illustrates an example of mapping a function for each object by an electronic device according to an embodiment.

FIG. 8 illustrates a method 800 of the electronic device for mapping a function according to the object according to an embodiment. FIG. 9A illustrates mapping examples 900 and 950 in which the electronic device maps the function according to the object, according to an embodiment. FIG. 9B illustrates mapping examples 900 and 950 in which the electronic device maps the function according to the object, according to an embodiment.

In step 801 of FIG. 8, the electronic device 101 may activate the mapping mode. The electronic device 101 may receive the button input of the digital pen 201 and may activate the mapping mode in response to the button input of the digital pen 201 being received. The mapping mode may refer to an operating state of the electronic device 101 in which a user environment for mapping functions to the button events is provided.

In FIG. 9A, the electronic device 101 may deactivate the mapping mode. In screenshot 901, the electronic device 101 may execute an air command 910 in response to the hovering input and the button input of the digital pen 201. The electronic device 101 may activate the mapping mode by an input to a function mapping object (e.g. a floating icon 920). As the mapping mode is activated, the electronic device 101 may constitute a layer on which the functions are mapped to the button events.

In step 803 of FIG. 8, the electronic device 101 may acquire application information in execution to constitute the layer. The application information may be information of a window of the application (i.e. the view). The electronic device 101 may identify a function mapping application. In FIG. 9A, the electronic device 101 may acquire the application information. In screenshot 903, the electronic device 101 may identify an application for mapping the functions to the button events. The electronic device 101 may identify a application among applications that are being executed in the background. The electronic device 101 may determine an application by which the functions are mapped to the button by separate inputs.

The application information may include information regarding the object, which may be a button-type component. The object may be buttons included in the window of the application. In examples, the object may be buttons providing a play/pause function of a media player application, providing a record function on a telephone application, or providing a save function on a note application. The application information may include layout information related to the positions of the objects on the window. The application information may include the layout information corresponding to the window provided by the application.

The electronic device 101 may constitute a function mapping layer on the display of the electronic device 101 in response to the button information of the digital pen 201 being received. The layer may be constituted on an active screen to receive the user input. In screenshot 905 of FIG. 9A, the electronic device 101 may constitute a function mapping transparent layer 930. The transparent layer may be a layer having a predetermined or higher level of transparency. The electronic device 101 may constitute a transparent layer for receiving the user input, and may display a UI or a guide of the application on the transparent layer. The electronic device 101 may receive the user input on the transparent layer.

In step 805 of FIG. 8, the electronic device 101 may display a function selection UI, constituted in step 803, on the display. The electronic device 101 may extract at least one of window ID, button component ID, a window event, a button component event, or combinations thereof, based on the application information. The electronic device 101 may constitute a guide UI, by which a function selection guide is provided to the user, based on the layout information. The electronic device 101 may constitute the guide ID based on at least one of the window ID, the button component ID, the number of button components, the window event, the number of button component events, or combinations thereof. The electronic device 101 may display the guide UI by overlaying the guide UI on the window of the application in execution.

In step 807, the electronic device 101 may receive user input when the tip of the digital pen 201 touches the electronic device 101. The electronic device 101 may identify a specific function provided on an application based on the user input.

The electronic device 101 may determine a specific function corresponding to user input. For example, the user input may be touching a specific button component on the application. The electronic device 101 may determine a function corresponding to a button component at which a touch input is located. The electronic device 101 may determine the specific input based on the electromagnetic signal generated by the digital pen 201. The electronic device 101 may detect a push input of the button of the digital pen 201 and hovering in gesture. The electronic device 101 may detect an electromagnetic signal through a sensor circuit or detect the push input of the button through reception of the communication signal through the communication signal according to the push input.

In view 951 of FIG. 9B, when the push input of the button of the digital pen 201 is detected when a visual indicator or a pointer according to the hovering in gesture of the digital pen 201 is located on a specific button component on an application, the electronic device 101 may determine a function corresponding to the button component. When the electronic device 101 detects the push input of the button of the digital pen 201 when the visual indicator of the digital pen 201 is located on the playback/stop button component 960 of a media application, the electronic device 101 may determine a playback/stop function of the media application as a function to be mapped to the button event.

The electronic device 101 may determine a function corresponding to an ID of an application including the button component, an ID of the button component, a command for performing the button component, and/or a parameter relevant to the function.

The electronic device 101 may display input information based on the user input. The electronic device 101 may acquire a movement path of the digital pen 201, a pressure applied by the digital pen 201 at the time of input, or slope information about the digital pen 201 at the time of input, and may display input information relevant to the acquired movement path, pressure, and/or slope information. The electronic device 101 may display a locus of the user input. The electronic device 101 detects the movement path of the digital pen 201, the pressure applied by the digital pen 201 at the time of input, or the slope of the digital pen 201 at the time of input, and thereby may determine a thickness, a shadow, transparency, or a line type relevant to the slope.

In step 809 of FIG. 8, the electronic device 101 may detect an extraction event for generating information about a function determined in step 807. That is, the functions for mapping to the button events may be determined according to the user input received before the extraction event. The electronic device 101 may generate information about the function to be mapped based on the user input that is input before the extraction event is generated. The extraction event may be for positively determining functions for the button events of the digital pen 201. The electronic device 101 may generate information that indicates a function through the extraction event. As the extraction event is detected, the electronic device 101 may determine whether to map any function to the button event as described below. The electronic device 101 detects the extraction event, and thereby may deactivate an activated mapping mode.

The electronic device 101 may detect an extraction event based on the electromagnetic signal caused by the digital pen 201 and the communication signal caused by the digital pen 201. The electronic device 101 may detect a change in the electromagnetic signal caused by the digital pen 201 according to movement of the digital pen 201. The electronic device 101 may detect a change in an EMR signal generated as the digital pen 201 moves away from the electronic device 101. The electronic device 101 may determine that a distance between the electronic device 101 and the digital pen 201 is beyond a fixed range. The electronic device 101 may determine that that the digital pen 201 is out of range, that is, that a position of the digital pen 201 is out of a hoverable range.

The electronic device 101 may determine that an extraction event is generated through detection of the communication signal caused by the digital pen 201. The communication signal caused by the digital pen 201 may be a radio signal generated by a release operation after the button of the digital pen 201 is pushed. For example, the communication signal caused by the digital pen 201 may be a BLE signal generated by a user input released after the button of the digital pen 201 is pushed. The digital pen 201 may transmit the communication signal to the electronic device 101.

The electronic device 101 may receive the communication signal from the digital pen 201. The electronic device 101 may receive the signal of the interlocked digital pen 201 through the BLE module. After the change in the electromagnetic signal is detected, if the communication signal is received within a predetermined time, the electronic device 101 may determine that the extraction event has occurred by receiving the communication signal received within the predetermined time after having detected the extinction of the electromagnetic signal. For example, in screenshot 953 of FIG. 9B, the electronic device 101 may determine that the extraction event has occurred by detecting a hovering out gesture and receiving the communication signal, by which the button of the digital pen 201 is released, within the threshold time. The electronic device 101 may generate information indicative of the play/pause function of the media player application.

In step 811 of FIG. 8, the electronic device 101 may identify the button events of the digital pen 201. The electronic device 101 may identify the function mapping button events in which the functions acquired in step 809 are mapped. The button events may be identified from among a set of button events which may include an input in which the button of the digital pen 201 is pressed one time (hereinafter, referred to as a single click event), an input in which the button of the digital pen 201 is pressed for a period of time equal to or longer than the threshold time (hereinafter, referred to as a long click event), an input in which the button of the digital pen 201 is pressed two times within a predetermined period of time (hereinafter, referred to as a double click event), or an input in which the button of the digital pen 201 is pressed three or more times within a predetermined period of time.

The electronic device 101 may provide a UI/user experience (UI/UX) by which the set of button events is provided. The electronic device 101 may identify the button events from among the set of button events based on an input on the UI or an input in accordance with the guide of the UX. The electronic device 101 may identify a single click event. The identified button event may be preset by the user setting or may be set according to the capability of the application in execution.

In step 813, the electronic device 101 may map the functions to the button events. The electronic device 101 may map the functions acquired in step 809 to the button events identified in step 811. The electronic device 101 may map identifiers of the button events and the identifiers of the functions. The electronic device 101 may store information indicative of the mapping in the memory of the electronic device 101. The electronic device 101 may map a function corresponding to not only a single button event but also to each of a plurality of button events. The electronic device 101 may constitute the mapping table that defines the button events and the functions corresponding to the button events. For example, in screenshot 955 of FIG. 9B, the media play/pause function may be mapped to the single click event of the digital pen 201. When the pressing input of the button of the digital pen 201 is detected, the electronic device 101 may control the application to play images or stop the playing of images.

Although the electronic device 101 is illustrated as identifying the button events to which the functions are to be mapped after the extraction event in FIG. 8, the disclosure is not limited thereto. The function mapping button events may be determined prior to the functions when entering the mapping mode or determined in parallel to the functions according to the user setting.

Figure 10:
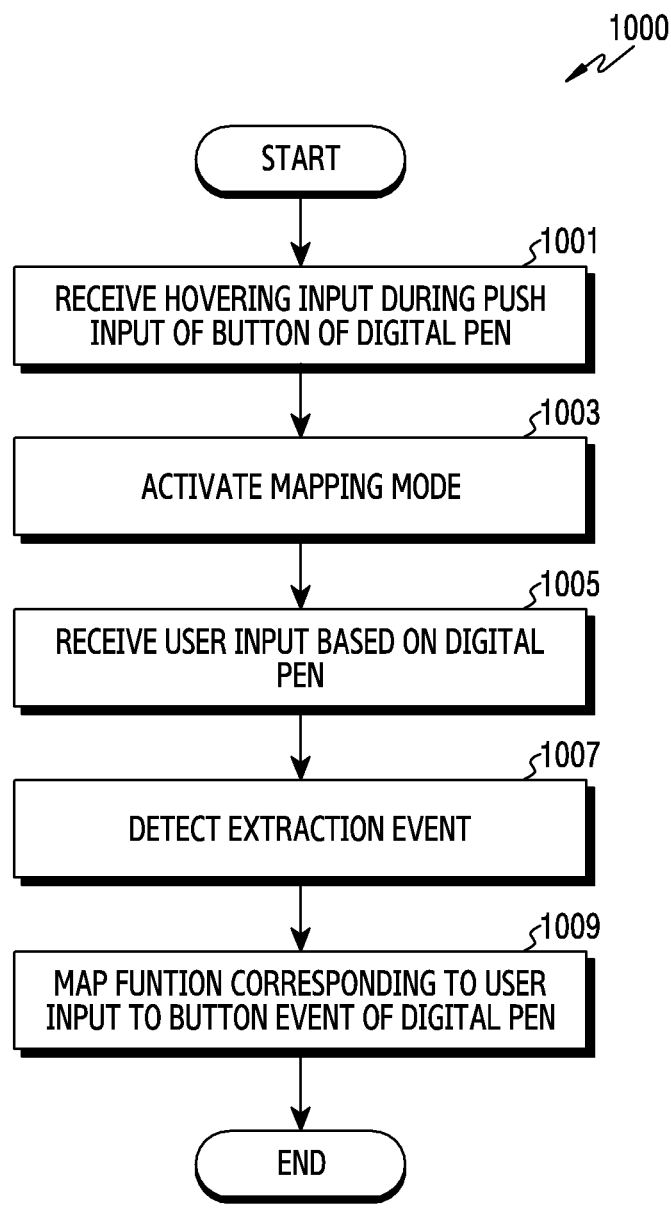
FIG. 10 illustrates a method of an electronic device for mapping a function corresponding to a user input according to an embodiment.
Figure 11:
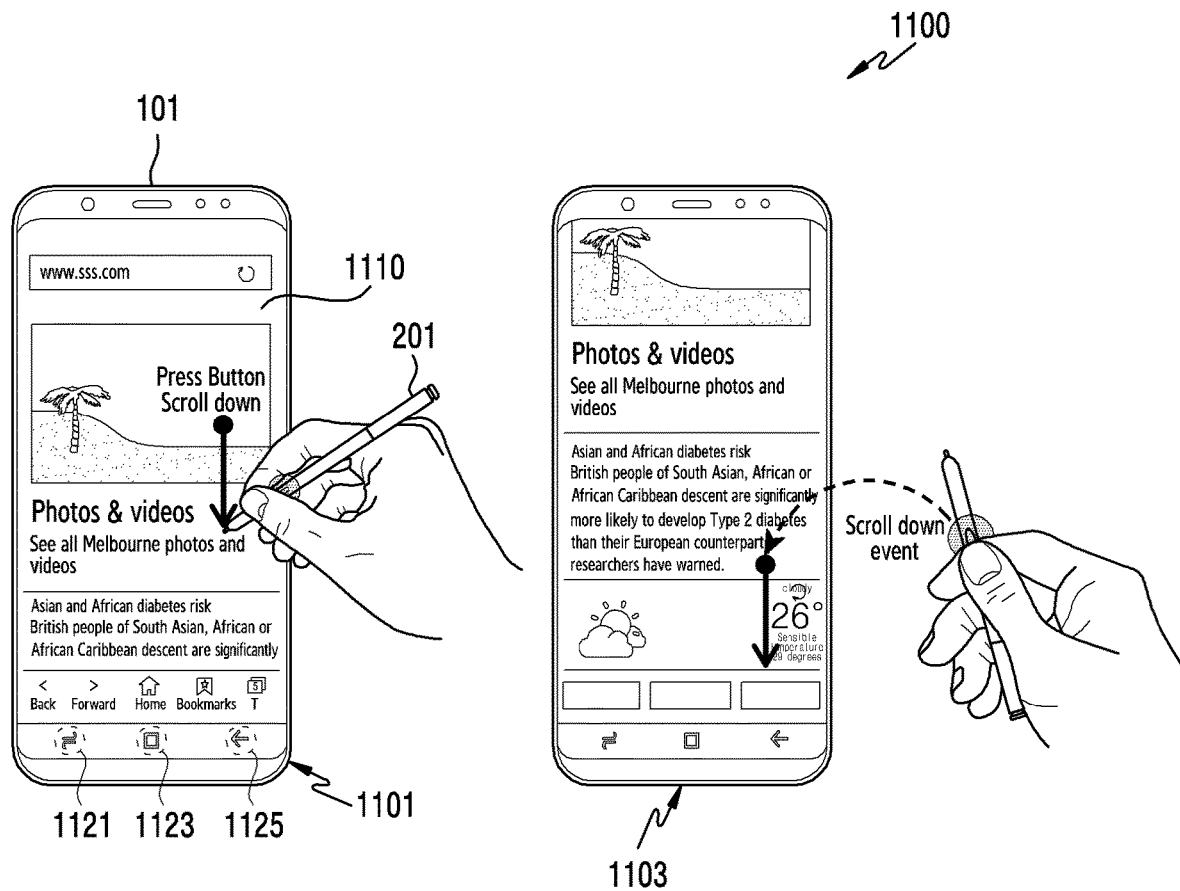
FIG. 11 illustrates an example of mapping a function corresponding to a user input by an electronic device according to an embodiment.

FIG. 10 illustrates a method 1000 of an electronic device for mapping a function corresponding to a user input according to an embodiment. FIG. 11 illustrates an example 1100 of mapping of a function corresponding to a user input of an electronic device according to an embodiment.

Referring to FIG. 10, in step 1001, the electronic device may determine whether a hovering input is received during a push input of a button of the digital pen 201 in an area where the hovering is not detected, that is, outside the hovering area. Depending on the user's button press input, the digital pen 201 may send a BLE signal to the electronic device 101. The electronic device 101 may receive a communication signal from the digital pen 201.

The electronic device 101 may detect the hovering input while the button of the digital pen 201 is pressed. The electronic device 101 may detect a pressed state of the button of the digital pen 201 by detecting an electromagnetic signal. The electronic device 101 may detect the hovering input based on the induced electromagnetic field. When the electronic device 101 detects the hovering input while the button of the digital pen 201 is pressed, the electronic device 101 may perform step 1003. The electronic device 101 may not perform the function mapping if the hovering input is not detected while the button of the digital pen 201 is pressed.

In step 1003, electronic device 101 may activate a mapping mode to map a function corresponding to a user input received in the hovering area to button events of the digital pen 201. When the mapping mode is activated, the processor 120 may be configured to extract a function to be mapped based on an electromagnetic signal detection of a sensor circuit of the electronic device 101 or a communication signal detection of a communication circuit. A guide UI providing possible user inputs on an application may be displayed by being overlaid on the application.

In step 1005, the electronic device 101 may receive a user input based on the digital pen 201. The electronic device 101 may acquire event information when a touch input is detected during the push input of the button of the digital pen 201. The electronic device 101 may determine a function corresponding to the touch input. For example, as illustrated in screenshot 1101 of FIG. 11, the electronic device 101 may detect an event that provides a scroll down function through a drag action on the Internet browser application 1110 while the button of the digital pen 201 is pressed. As another example, the touch input may be associated with a soft key, such as a single click event of a background display key 1121 and the home button 1123, a long click event of the home button 1123, and a touch input of a back button 1125.

In step 1007, the electronic device 101 may detect an extraction event based on the detection of the communication signal in response to the disappearance of the electromagnetic signal and the release of the button input of the digital pen 201. The electronic device 101 may deactivate the mapping mode by detecting the extraction event. The user input on the electronic device 101 may then be used to perform a function on the display. With the mapping mode disabled, a user input may not be used to determine the function for mapping to the buttons of the digital pen 201.

In step 1009, the electronic device 101 may map a function corresponding to the user input to button events of digital pen 201. The electronic device 101 may map a function corresponding to the obtained user input to the button events. The electronic device 101 may map identifiers of the button events to identifiers of functions. The electronic device 101 may store information indicating the mapping relationship in a memory of the electronic device 101. For example, as illustrated in screenshot 1103 of FIG. 11, a scroll down function may be mapped to a single click event of a button of the digital pen 201. As another example, a page turnover function of an e-book application may be mapped to a single click event of a button of the digital pen 201.

The digital pen 201 may transmit a communication signal to the electronic device 101 based on a user's button input. The electronic device 101 may identify the scroll down function mapped to the button events by receiving a communication signal from the digital pen 201. The electronic device 101 may perform a scroll down function on the browser application. The screen of the electronic device 101 may be scrolled down according to a press input of a button of the digital pen 201.

A function may be mapped for each button event. After detecting the long click event of the digital pen 201, the electronic device 101 may detect a scroll up action of the digital pen 201. Subsequently, when the extraction event occurs, the electronic device 101 may map a scroll up function to the long click event of the digital pen 201.

Figure 12:
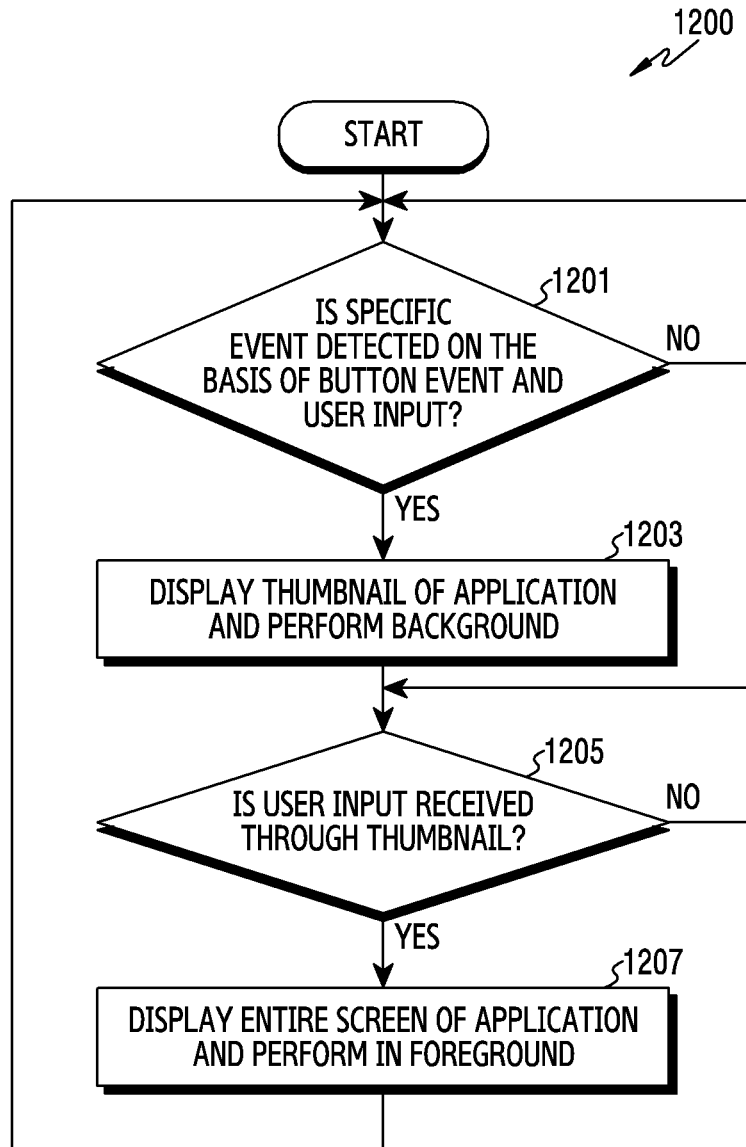
FIG. 12 illustrates a method of an electronic device for performing a glance view function according to an embodiment.
Figure 13:
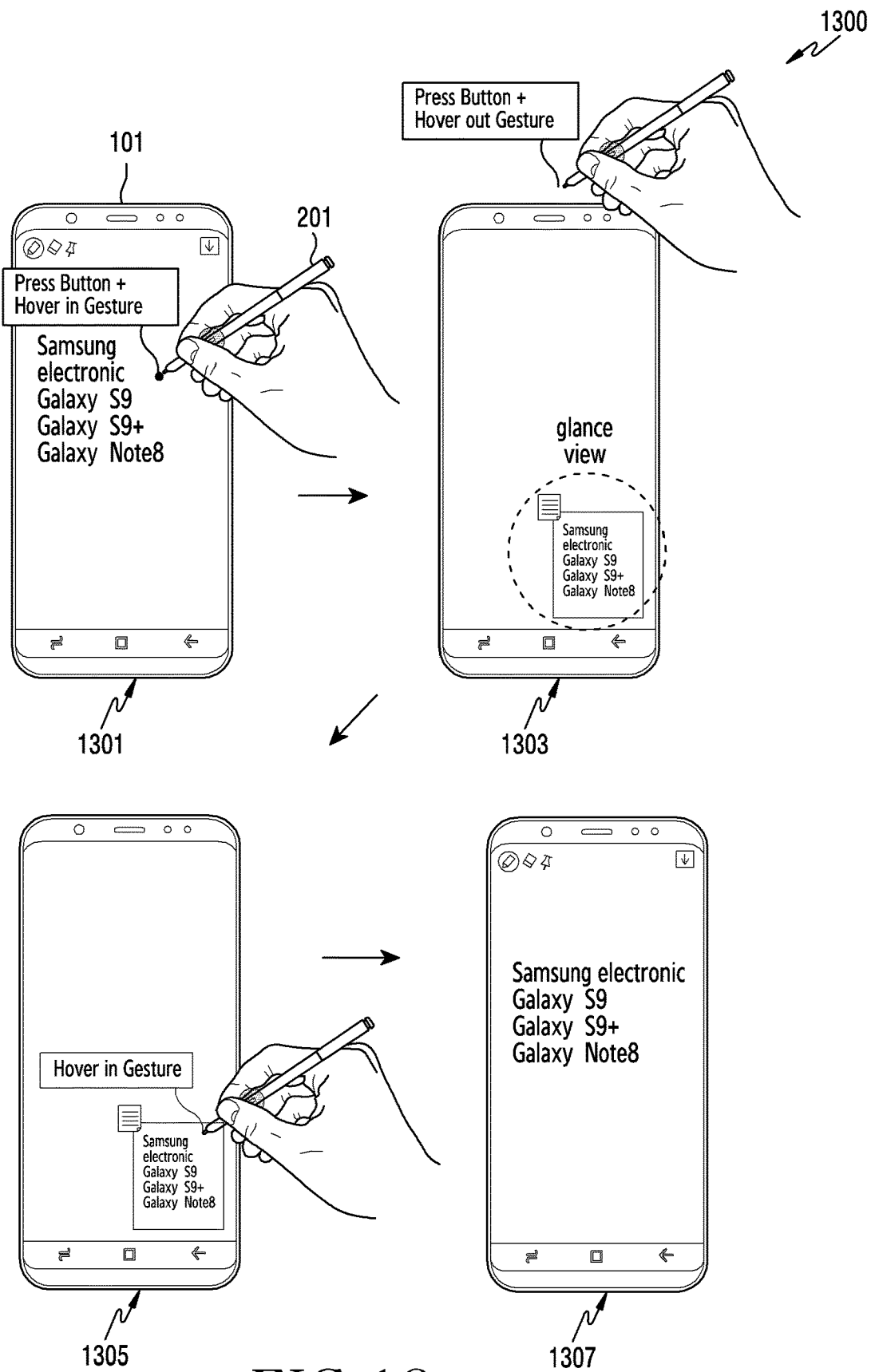
FIG. 13 illustrates an example of a glance view function of an electronic device according to an embodiment.

FIG. 12 illustrates an operation flow 1200 of an electronic device for performing a glance view function according to an embodiment. FIG. 13 illustrates an example 1300 of a glance view function of an electronic device according to an embodiment.

The glance view function may refer to a function of displaying a screen of an application with only a partial area (e.g., thumbnail image or icon) of the entire area of the electronic device 101 and operating the corresponding application in the background. A situation where the glance view function is mapped to a button event of the digital pen 201 will be described. When an application being executed is an application (e.g., memo pad application or note application) supporting the glance view function, the electronic device 101 may configure a layer indicating the glance view function.

Referring to FIG. 12, in step 1201, the electronic device 101 may determine whether a specific event is detected, based on a button event and a user input. The electronic device 101 may execute an application in the foreground. When the application is being executed, the electronic device 101 may determine whether the specific event is detected. The application may be executed in the highest layer while being displayed on the entire area of a screen of the electronic device 101.

The electronic device 101 may determine whether a specific event according to a combination of a button event and a user input is detected. The specific event may be a predefined event for executing the glance view function. For example, the specific event may be an extraction event. As an example, as illustrated in FIG. 13, when detecting a button press input and a hover-in input of the digital pen 201 and then detecting a button press input and a hover-out input of the digital pen 201, the electronic device may determine that the specific event is detected.

The electronic device 101 may determine whether a specific event is detected, based on a combination of a detection interval of a communication signal and a detection interval of an electromagnetic signal. The electronic device 101 may receive a communication signal according to a button input of the digital pen 201 through a BLE module. The electronic device 101 may detect an electromagnetic signal according to a motion and a button input of the digital pen 201 through a sensor circuit (e.g., EMR resonant circuit).

If a specific event is detected, the electronic device 101 may perform step 1203, described below. If a specific event is not detected, the electronic device 101 may repeat step 1201. The electronic device 101 may execute an application in the foreground and provide a screen for executing the application on the entire screen area of the electronic device 101.

In step 1203, the electronic device 101 may display a thumbnail of the application and execute the application in the background. The electronic device 101 may switch a screen of the application to a glance view. The electronic device 101 may display a thumbnail of the application according to the glance view function. The electronic device 101 may display a thumbnail of the application on a bottom right area as in screenshot 1303 of FIG. 13 of the entire screen area of the electronic device 101. Although a thumbnail has been described by way of example in FIGS. 12 and 13, the electronic device 101 may display, on a partial area, an icon indicating a glance view or an icon indicating an application being executed in the background. The electronic device 101 may control so as to execute the application in step 1201, which is being executed in the highest layer, in the background.

In step 1205, the electronic device 101 may determine whether a user input is received through the thumbnail. The user input may be an input made by the digital pen 201 and may be a hover-in input. As illustrated in screenshot 1305 of FIG. 13, the electronic device 101 may determine whether a hover-in input of the digital pen 201 is received over the area corresponding to the thumbnail. The user input may also be a touch input. The electronic device 101 may determine whether a touch input of the digital pen 201 is detected on the thumbnail area on the screen. The user input may also be a button event of the digital pen 201. If the user input is received through the thumbnail, the electronic device 101 may perform step 1207, described below. If the user input is not received through the thumbnail, the electronic device 101 may repeat 1205.

In step 1207, the electronic device 101 may display the entire screen of the application and execute the application in the foreground. The electronic device 101 may switch the application from the glance view state to the entire screen state. As illustrated in screenshot 1307 of FIG. 13, the electronic device may display a note application on the entire screen area when a hover-in input of the digital pen 201 is received over a thumbnail of the note application. The electronic device 101 may execute an application, which is being executed in the background, in the foreground. The electronic device 101 may place, in the highest layer, the layer where the application is being executed.

Figure 14:
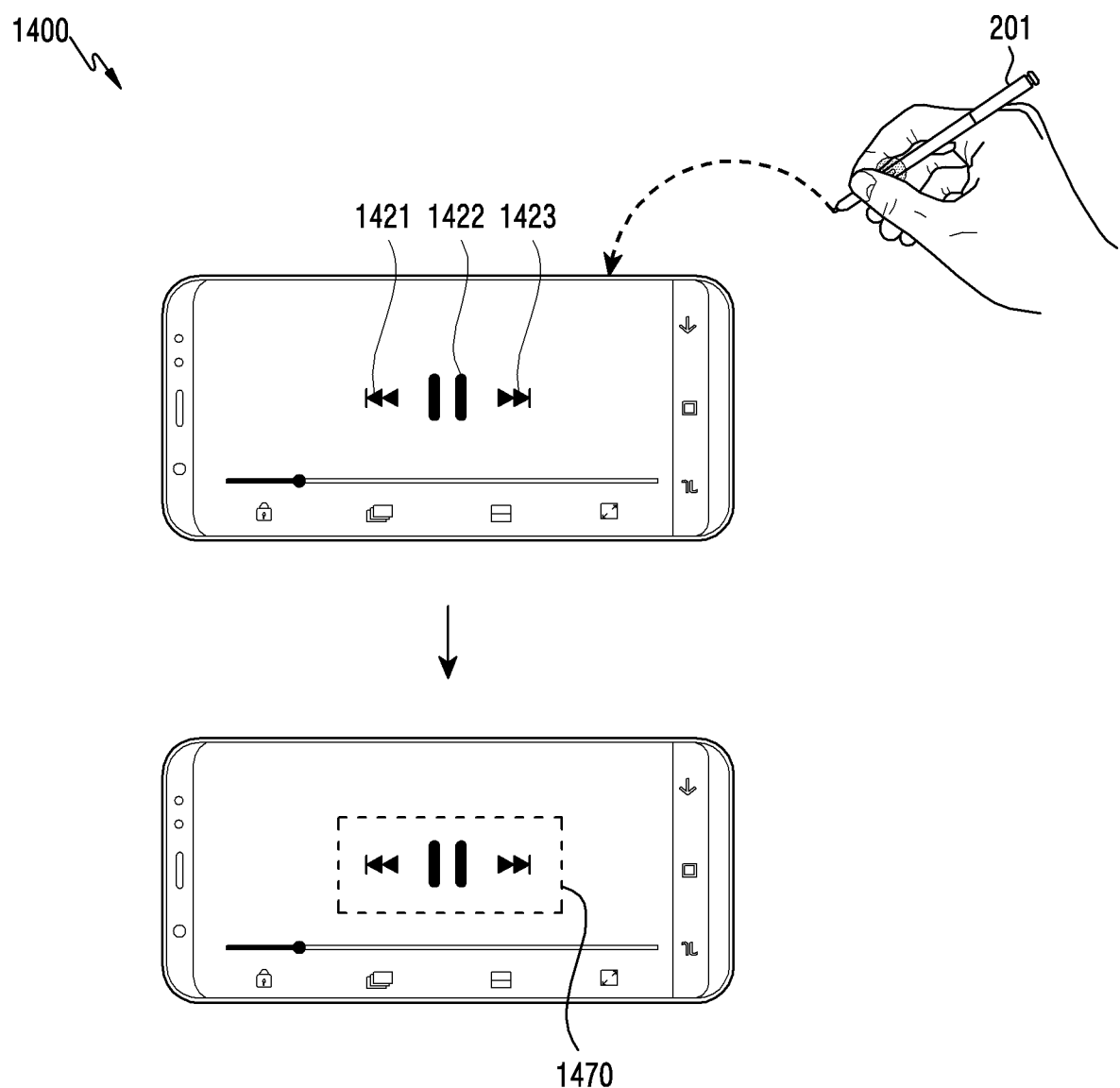
FIG. 14 illustrates an example of visual information for function mapping of an electronic device according to an embodiment.

FIG. 14 illustrates an example 1400 of visual information for function mapping of an electronic device according to an embodiment.

In order to intuitively provide a user with a guide for function mapping, the electronic device may provide visual information indicating, among button components of an application being executed, button components allowing function mapping corresponding to a button event of the digital pen 201. By providing the visual information, the electronic device 101 may display different UIs between the button components providing functions that can be mapped to a button event of the digital pen 201 and the other button components.

Referring to FIG. 14, the digital pen 201 may detect a button event according to a user input, such as a long-click event. The digital pen 201 may transmit a communication signal to the electronic device 101. The electronic device may receive the communication signal. In response to reception of the communication signal, the electronic device 101 may identify the functions that can be mapped to the button event of the digital pen 201 among functions of an application being executed. The electronic device 101 may display visual information indicating an area 1470 that includes a rewind button component 1421, a play and pause button component 1422, and a fast forward button component 1423 in a video player application.

As an example, the electronic device may display a dotted-line area including the rewind button component, the play and pause button component, and the fast forward button component on the application screen. The electronic device 101 may dimly (e.g., blur) display areas other than the rewind button component, the play and pause button component, and the fast forward button component. The electronic device 101 may display a dotted-line rewind button component area, a dotted-line play and pause button component area, and a dotted-line fast forward button component area. A contour line with a particular color may be provided at the edge of each button component area. Since functions for mapping to a button event of the digital pen 201 are more intuitively provided on the application, the electronic device can improve convenience in use of function selection.

Figure 15:
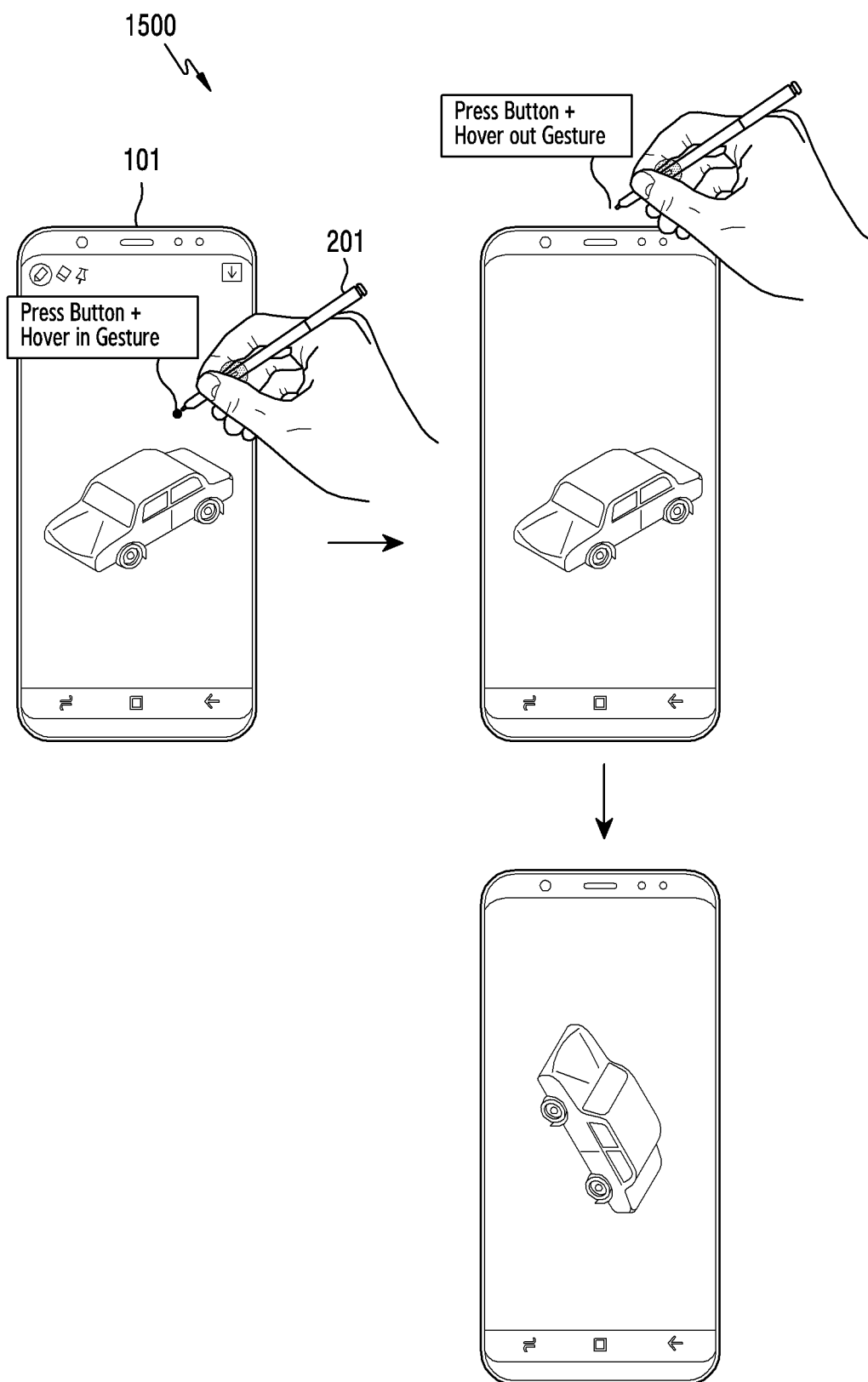
FIG. 15 illustrates an example of function mapping for each view mode of an electronic device according to an embodiment.

FIG. 15 illustrates an example 1500 of function mapping for each view mode of an electronic device according to an embodiment.

A view mode of the electronic device 101 may be defined based on a direction relative to the ground. For example, the view mode may include a landscape mode and a portrait mode. In order to intuitively map functions to a button event of the digital pen 201 by considering the view mode, the electronic device 101 may distinguish between when the electronic device 101 is in the landscape mode and when the electronic device 101 is in the portrait mode. The functions mapped to a button event may be functions associated with the view mode of a screen viewed by a user.

Referring to FIG. 15, when detecting a button press input and a hover-in input of the digital pen 201 and then detecting a button press input and a hover-out input of the digital pen 201 in the portrait mode, the electronic device 101 may map an object rotation function to the button press input. Subsequently, on detecting a button event in the portrait mode of the electronic device 101, the electronic device 101 may provide a view including a 90-degree rotated state of an object provided on a view in the portrait mode. The object rotation function may be specific to the portrait mode. For example, the electronic device 101 may be rotated. A gyro sensor of the electronic device 101 may detect rotation of the electronic device 101. The electronic device 101 may operate in the landscape mode. Even when a button event is detected in the landscape mode of the electronic device 101, the electronic device 101 may not perform the object rotation function.

According to an embodiment, a method for an electronic device wirelessly connected to a stylus pen providing a button event may include displaying a user interface for selecting at least one function, receiving a first user input for selecting one function among the at least one function by using a button event of the pen while the user interface is displayed, and mapping the selected function to an input made through the button, in response to the first user input.

The method for the electronic device may further include, after the mapping of the selected function, receiving a second user input through the button of the pen while the user interface is displayed, and executing the selected function, in response to the second user input.

Receiving the first user input may include receiving a first signal, which indicates that the button of the pen is pressed, by using a first wireless communication circuit; and receiving a second signal, which indicates that the button of the pen is released, by using a second wireless communication circuit.

Selecting one function may include receiving the first signal while it is detected that the pen touches or approaches the display of the electronic device, and acquiring at least one of input location information, motion trajectory information, motion speed information, and pressure information of the pen, at least partially based on the received first signal, and selecting one function among the at least one function, at least partially based on the acquired information.

The selected function may be mapped to an input made through the button by receiving, after the first signal is received, the second signal while it is detected that the pen is located beyond a selected distance from the display.

The method for the electronic device may further include displaying a GUI indicating that the electronic device is in a state where the selected function can be mapped to an input made through the button, in response to the receiving of the first signal.

The first wireless communication circuit may be configured to support EMR communication, and the second wireless communication circuit may be a circuit configured to support BLE communication.

The method for the electronic device may further include generating, by the pen, the first signal by pressing the button of the pen once or pressing the button of the pen twice.

The first user input received using the button of the pen may include an event for executing a specific function by using the pen, and the selected function may be the same function as the specific function.

An interval where a press input of the pen is maintained may include an interval where the first user input is received.

The electronic device can provide a more intuitive mapping scheme by displaying a UI and minimizing operations for identifying a function or button event on the displayed UI. The electronic device can establish a new event for function mapping by using switching between an operation interval of a communication signal and an operation interval of an electromagnetic signal and a button event of the digital pen 201. By establishing the new event, the electronic device can provide more intuitive function mapping and can also maximize user convenience.

As previously noted, methods according to embodiments of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods of the disclosure.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. A plurality of such memories may be included in the electronic device.

In addition, the programs may be stored in an attachable storage device which may access the electronic device through communication networks such as the Internet, Intranet, LAN, Wide LAN (WLAN), and storage area network (SAN) or a combination thereof. Such a storage device may access the electronic device via an external port. A separate storage device on the communication network may access a portable electronic device.

As used herein, the term "module" may include a unit implemented in hardware, software, or firmware, and may interchangeably be used with other terms "logic," "logic block," "part," or "circuitry". A module may be a single integral component, or a minimum unit or part adapted to perform one or more functions. For example, The module may be implemented in a form of an application-specific integrated circuit (ASIC).

Embodiments as set forth herein may be implemented as software including one or more instructions that are stored in a storage medium that is readable by a machine. For example, a processor of the machine may invoke at least one of the one or more instructions stored in the storage medium, and execute the instruction, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" indicates that the storage medium is a tangible device, and does not include a signal, but this term does not differentiate between where data is semi-permanently or temporarily stored in the storage medium.

A method of the disclosure may be included and provided in a computer program product that may be traded as a product between a seller and a buyer. The computer program product may be distributed in the form of a machine-readable storage medium (e.g., compact disc read only memory (CD-ROM)), or distributed (e.g., downloaded or uploaded) online via an application store (e.g., PlayStore™), or directly between two user devices. If distributed online, at least part of the computer program product may be temporarily generated or at least temporarily stored in the machine-readable storage medium, such as memory of the manufacturer's server, a server of the application store, or a relay server.

Each component of the above-described components may include a single entity or multiple entities. One or more of the above-described components may be omitted, or one or more other components may be added. Alternatively or additionally, a plurality of components may be integrated into a single component. In such a case, the integrated component may still perform one or more functions of each of the plurality of components in the same or similar manner as they are performed by a corresponding one of the plurality of components prior to the integration. Operations performed by the module, the program, or another component may be performed sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
a housing;
a display visible through a part of the housing;
at least one wireless communication circuit disposed inside the housing and configured to be wirelessly connected to a pen that provides a button event;
a processor disposed inside the housing and operatively connected to the display and the at least one wireless communication circuit; and
a memory disposed inside the housing and operatively connected to the processor, the memory being configured to store an application program including a user interface for selecting at least one function, and to store instructions that, when executed, cause the processor to:
display the user interface on the display;
in response to the button event, display visual information indicating the at least one function on the user interface;
at least partially receive, while the user interface is displayed on the display, through the at least one wireless communication circuit, a first user input for selecting the at least one function by using the button event of the pen;
select the at least one function selected by the first user input at least partially received while the user interface is displayed on the display; and
map the selected at least one function to a second user input made through the button and store the selected at least one function in the memory, in response to the first user input at least partially received while the user interface is displayed on the display.

2. The electronic device of claim 1, wherein the instructions further cause the processor to:
execute the selected at least one function, in response to the second user input.

3. The electronic device of claim 1, wherein the at least one wireless communication circuit comprises a first wireless communication circuit and a second wireless communication circuit, and the instructions further cause the processor to receive the first user input by:
  receiving a first signal, which indicates that the button of the pen is pressed, by using the first wireless communication circuit; and
  receiving a second signal, which indicates that the button of the pen is released, by using the second wireless communication circuit.

4. The electronic device of claim 3, wherein the instructions further cause the processor to:
  receive the first signal while it is detected that the pen touches or approaches the display; and
  acquire at least one of input location information, motion trajectory information, motion speed information, and pressure information of the pen, at least partially based on the received first signal, and select the function, at least partially based on the acquired information.

5. The electronic device of claim 4,
  wherein the instructions further cause the processor to map the selected at least one function to the second user input by receiving, after the first signal is received, the second signal while it is detected that the pen is located beyond a selected distance from the display.

6. The electronic device of claim 3,
  wherein the instructions further cause the processor to display a graphic user interface (GUI) indicating that the electronic device is in a state in which the selected at least one function can be mapped to the second user input, in response to the receiving of the first signal.

7. The electronic device of claim 3,
  wherein the first wireless communication circuit comprises a circuit configured to support electromagnetic resonance (EMR) communication, and the second wireless communication circuit comprises a circuit configured to support Bluetooth™ low energy (BLE) communication.

8. The electronic device of claim 3,
  wherein the pen is configured to generate the first signal by pressing the button of the pen at least once.

9. The electronic device of claim 1,
  wherein the first user input received using the button of the pen includes an event for executing a specific function by using the pen, and
  wherein the selected at least one function is identical to the specific function.

10. The electronic device of claim 9,
  wherein a press input of the pen is maintained while the first user input is received.

11. A method for an electronic device wirelessly connected to a pen that provides a button event, the method comprising:
  displaying a user interface for selecting at least one function;
  in response to the button event, displaying visual information indicating the at least one function on the user interface;
  at least partially receiving, while the user interface is displayed on a display of the electronic device, a first user input for selecting the at least one function by using the button event of the pen;
  selecting the at least one function selected by the first user input at least partially received while the user interface is displayed on the display; and
  mapping the selected at least one function to a second user input made through the button and storing the selected at least one function in a memory of the electronic device, in response to the first user input at least partially received while the user interface is displayed on the display.

12. The method of claim 11, further comprising:
  executing the selected at least one function, in response to the second user input.

13. The method of claim 11, wherein the first user input is received by:
  receiving a first signal, which indicates that the button of the pen is pressed, by using a first wireless communication circuit; and
  receiving a second signal, which indicates that the button of the pen is released, by using a second wireless communication circuit.

14. The method of claim 13, wherein selecting the at least one function comprises:
  receiving the first signal while it is detected that the pen touches or approaches the display of the electronic device; and
  acquiring at least one of input location information, motion trajectory information, motion speed information, and pressure information of the pen, at least partially based on the received first signal, and selecting the at least one function, at least partially based on the acquired information.

15. The method of claim 14,
  wherein the selected at least one function is mapped to the second user input by receiving, after the first signal is received, the second signal while it is detected that the pen is located beyond a selected distance from the display.

16. The method of claim 13, further comprising displaying a graphic user interface (GUI) indicating that the electronic device is in a state in which the selected at least one function can be mapped to the second user input, in response to the receiving of the first signal.

17. The method of claim 13,
  wherein the first wireless communication circuit comprises a circuit configured to support electromagnetic resonance (EMR) communication, and the second wireless communication circuit comprises a circuit configured to support Bluetooth™ low energy (BLE) communication.

18. The method of claim 13, further comprising generating, by the pen, the first signal by pressing the button of the pen at least once.

19. The method of claim 11,
  wherein the first user input received using the button of the pen includes an event for executing a specific function by using the pen, and
  wherein the selected at least one function is identical to the specific function.

20. The method of claim 19,
  wherein a press input of the pen is maintained while the first user input is received.

* * * * *